US012738503B2

(12) United States Patent
Itai et al.

(10) Patent No.: US 12,738,503 B2
(45) Date of Patent: Sep. 15, 2026

(54) BINDER FOR ALL-SOLID-STATE SECONDARY BATTERY, BINDER COMPOSITION FOR ALL-SOLID-STATE SECONDARY BATTERY, SLURRY FOR ALL-SOLID-STATE SECONDARY BATTERY, SOLID ELECTROLYTE SHEET FOR ALL-SOLID-STATE SECONDARY BATTERY, METHOD FOR PRODUCING SAME, ALL-SOLID-STATE SECONDARY BATTERY, AND METHOD FOR PRODUCING SAME

(71) Applicant: ENEOS Materials Corporation, Minato-ku (JP)

(72) Inventors: Shingo Itai, Minato-Ku (JP); Keigo Aso, Minato-Ku (JP); Masashi Iida, Minato-Ku (JP); Tatsuya Abe, Minato-Ku (JP)

(73) Assignee: ENEOS Materials Corporation, Minato-ku (JP)

( * ) Notice: Subject to any disclaimer, the term of this patent is extended or adjusted under 35 U.S.C. 154(b) by 560 days.

(21) Appl. No.: 18/263,236

(22) PCT Filed: Jan. 14, 2022

(86) PCT No.: PCT/JP2022/001103

§ 371 (c)(1),
(2) Date: Jul. 27, 2023

(87) PCT Pub. No.: WO2022/163387

PCT Pub. Date: Aug. 4, 2022

(65) Prior Publication Data

US 2024/0120489 A1 Apr. 11, 2024

(30) Foreign Application Priority Data

Jan. 29, 2021 (JP) ................................ 2021-012931

(51) Int. Cl.

| | |
|---|---|
| ***H01M 4/62*** | (2006.01) |
| ***C08F 36/06*** | (2006.01) |
| ***C08K 5/544*** | (2006.01) |
| ***H01M 4/02*** | (2006.01) |
| ***H01M 10/0562*** | (2010.01) |
| ***H01M 10/058*** | (2010.01) |

(52) U.S. Cl.

CPC ............. *H01M 4/622* (2013.01); *C08F 36/06* (2013.01); *C08K 5/544* (2013.01); *H01M 10/0562* (2013.01); *H01M 10/058* (2013.01); *H01M 2004/027* (2013.01); *H01M 2004/028* (2013.01); *H01M 2300/0068* (2013.01)

(58) Field of Classification Search

CPC ............. H01M 4/622; H01M 10/0562; H01M 10/058; H01M 10/052; C08F 36/06; C08K 5/544; C08K 5/134; C08K 5/372; C08C 19/02; C08C 19/22; C08C 19/25; C08C 19/44

See application file for complete search history.

(56) References Cited

U.S. PATENT DOCUMENTS

| | | | | |
|---|---|---|---|---|
| 4,501,857 | A | 2/1985 | Kishimoto et al. | |
| 4,673,714 | A | 6/1987 | Kishimoto et al. | |
| 6,200,707 | B1 | 3/2001 | Takada et al. | |
| 6,291,596 | B1 | 9/2001 | Sasanuma et al. | |
| 2011/0021731 | A1 | 1/2011 | Hirata et al. | |
| 2012/0273736 | A1 | 11/2012 | James et al. | |
| 2013/0260241 | A1 | 10/2013 | Sone et al. | |
| 2014/0038041 | A1 | 2/2014 | Kajiwara et al. | |
| 2015/0147660 | A1* | 5/2015 | Fujiki | H01M 4/62 29/623.5 |
| 2015/0361210 | A1 | 12/2015 | Nosaka et al. | |
| 2016/0141597 | A1 | 5/2016 | Umeyama et al. | |
| 2016/0333235 | A1 | 11/2016 | Nakatani et al. | |
| 2018/0037674 | A1* | 2/2018 | Yamada | C08F 236/06 |
| 2019/0097235 | A1 | 3/2019 | Murase et al. | |
| 2019/0372157 | A1 | 12/2019 | Oura | |
| 2020/0235373 | A1* | 7/2020 | Tanaka | H01M 50/46 |
| 2023/0142834 | A1 | 5/2023 | Abe et al. | |

FOREIGN PATENT DOCUMENTS

| | | | |
|---|---|---|---|
| EP | 3 595 069 | A1 | 1/2020 |
| EP | 4 191 699 | A1 | 6/2023 |
| JP | 63-4841 | B2 | 2/1988 |
| JP | 1-37970 | B2 | 8/1989 |
| JP | 7-87045 | B2 | 9/1995 |

(Continued)

OTHER PUBLICATIONS

Korean Office Action issued Nov. 13, 2025 in Korean Patent Application No. 10-2023-7029119 (with unedited computer-generated English translation), 23 pages.

Japanese Notice of Reasons for Refusal issued Sep. 2, 2025 in Japanese Patent Application No. 2022-578234 with Computer-generated English translation, 8 pgs.

International Search Report issued Mar. 15, 2022 in PCT/JP2022/001103, filed on Jan. 14, 2022, 2 pages.

Avgeropoulos et al., "Synthesis and Microphase Separation of Linear Triblock Terpolymers of Polystyrene, High 1,4- Polybutadiene, and High 3,4-Polyisoprene", *Macromolecules* 2002, 35, pp. 4030-4035.

J. Branderup, E. Immergut, E. Grulke, eds. "PolymerHandbook", 4th Ed., Wiley_Interscience, New York,1999, Section VII,pp. 702-707.

(Continued)

*Primary Examiner* — Stewart A Fraser

(74) *Attorney, Agent, or Firm* — Oblon, McClelland, Maier & Neustadt, L.L.P.

(57) ABSTRACT

A binder for an all-solid-state secondary battery, which can suppress binder migration in a production process for an electrode of an all-solid-state secondary battery, leading to satisfactory binding properties and flexibility of the resultant electrode, and to excellent lithium ion conductivity, and by extension, can achieve a satisfactory cycle life characteristic. The binder for an all-solid-state secondary battery includes a conjugated diene-based polymer (A) that has a conjugated diene unit based on a conjugated diene compound, and has a solubility parameter (SP value) of 16.80 $MPa^{1/2}$ or more and 17.80 $Mpa^{1/2}$ or less.

20 Claims, No Drawings

(56) References Cited

FOREIGN PATENT DOCUMENTS

| | | | |
|---|---|---|---|
| JP | 11-86899 | A | 3/1999 |
| JP | 11-288720 | A | 10/1999 |
| JP | 2000-37632 | A | 2/2000 |
| JP | 5093544 | B2 | 12/2012 |
| JP | 5120522 | B2 | 1/2013 |
| JP | 2016-100159 | A | 5/2016 |
| JP | 2017-120708 | A | 7/2017 |
| JP | 6179498 | B2 | 8/2017 |
| JP | 2019-207840 | A | 12/2019 |
| KR | 10-2013-0020938 | A | 3/2013 |
| KR | 10-2016-0103063 | A | 8/2016 |
| WO | WO 2009/107784 | A1 | 9/2009 |
| WO | WO 2011/086983 | A1 | 7/2011 |
| WO | WO 2014/133097 | A1 | 9/2014 |
| WO | WO 2017/155059 | A1 | 9/2017 |
| WO | WO 2018/163776 | A1 | 9/2018 |
| WO | WO 2021/187270 | A1 | 9/2021 |

OTHER PUBLICATIONS

J. Branderup, E. Immergut, E. Grulke, eds. "PolymerHandbook", 4th Ed., Wiley_Interscience, New York,1999, SectionVII,pp. 704.
Grulke "Solubility Paramter Values", Polymer Handbook, 4th Ed., pp. VII-675 to VII-711.
Ohtomo et al. "All-solid-state lithium secondary batteries using the $75Li_2S.25P_2S_5$ glass and the $70Li_2S.30P_2S_5$ glass-ceramic as solid electrolytes", Journal of Power Sources 233 (2013) pp. 231-235.
Hayashi et al. "High Lithium Ion Conductivity of Glass-Ceramics Derived from Mechanically Milled Glassy Powders", Chemistry Letters 2001, pp. 872-873.
Extended European Search Report issued on Jun. 17, 2024, in corresponding European Patent Application No. 22745611.8, 6 pages.

* cited by examiner

BINDER FOR ALL-SOLID-STATE SECONDARY BATTERY, BINDER COMPOSITION FOR ALL-SOLID-STATE SECONDARY BATTERY, SLURRY FOR ALL-SOLID-STATE SECONDARY BATTERY, SOLID ELECTROLYTE SHEET FOR ALL-SOLID-STATE SECONDARY BATTERY, METHOD FOR PRODUCING SAME, ALL-SOLID-STATE SECONDARY BATTERY, AND METHOD FOR PRODUCING SAME

CROSS REFERENCE TO RELATED APPLICATIONS

This application is a National Stage entry under 35 U.S.C. § 371 of PCT/JP2022/001103, filed on Jan. 14, 2022, and claims priority to Japanese Patent Application No. 2021-012931, filed on Jan. 29, 2021, the entire contents of which are incorporated herein by reference.

TECHNICAL FIELD

The present invention relates to a binder for an all-solid-state secondary battery, a binder composition for an all-solid-state secondary battery containing the binder, a slurry for an all-solid-state secondary battery containing the composition and a solid electrolyte, a solid electrolyte sheet for an all-solid-state secondary battery formed by applying the slurry onto a substrate and drying the slurry and a method of producing the same, and to an all-solid-state secondary battery including the sheet and a method of producing the same.

BACKGROUND ART

Active research is currently underway on large lithium ion batteries with a view to their use in a driving power source for an automobile or the like, a household storage battery, and the like. Many of widely-used lithium ion secondary batteries use an electrolytic solution. An all-solid-state secondary battery, which uses a solid electrolyte in place of the electrolytic solution, and whose constituent materials are all solids, is being developed as an ultimate battery that combines safety with a high energy density and a long life.

The all-solid-state secondary battery uses the solid electrolyte showing high ion conductivity, and hence is free of dangers of liquid leakage and ignition, thereby being excellent in safety and reliability. In addition, the all-solid-state secondary battery is also suited for an increase in energy density through stacking of electrodes. Specifically, the all-solid-state secondary battery can be a battery having a structure in which an active material layer and a solid electrolyte layer are arranged side by side and serialized. In this case, a metal package for encapsulating a battery cell, and a copper wire and a busbar for connecting battery cells can be omitted, and hence the energy density of the battery can be greatly increased. In addition, for example, good compatibility with a positive electrode material capable of achieving an increase in potential is also given as an advantage.

On the other hand, problems in production of the all-solid-state secondary battery have also become apparent. Specifically, when a pressure-molded body of a mixture obtained by mixing the solid electrolyte serving as an electrolyte and an active material is prepared in order to increase a contact area therebetween, the pressure-molded body is hard and brittle and is poor in processability. In addition, the active material undergoes a volume change through storage and release of lithium ions, and hence has had a problem in the pressure-molded body, such as occurrence of a remarkable reduction in capacity due to, for example, peeling of the active material along with charge-discharge cycles.

In view of the foregoing, in order to enhance moldability, investigations have been made on a technology involving further adding a binder component to the above-mentioned mixture to improve the moldability (see, for example, Patent Literatures 1 to 7).

CITATION LIST

Patent Literature

[PTL 1] JP 11-86899 A
[PTL 2] JP 07-87045 B2
[PTL 3] WO 2009/107784 A1
[PTL 4] JP 5120522 B2
[PTL 5] JP 5093544 B2
[PTL 6] JP 6179498 B2
[PTL 7] JP 2016-100159 A

SUMMARY OF INVENTION

Technical Problem

The binder component disclosed in each of Patent Literatures 1 to 7 described above, which is formed of a polymer compound, has been insufficient in terms of suppression of binder migration. The "binder migration" refers to the following phenomenon: when a coating material (also called a "paste" or a "slurry") containing, for example, an electrode active material, a conductivity-imparting agent, a binding agent (binder), and a solvent is applied and dried, the binding agent moves to the surface layer of the coating film together with the solvent, with the result that the binding agent is segregated in the surface layer.

In a production process for an electrode of an all-solid-state secondary battery, when the suppression of the binder migration is insufficient, the surface of an active material layer is covered with the segregated polymer compound, and hence there have been problems in that: lithium ion conductivity between solid electrolytes and that between a solid electrolyte and an electrode active material are liable to be inhibited; and the binding properties and flexibility of the resultant electrode are poor. Accordingly, a high-level cycle life characteristic required of a current all-solid-state secondary battery cannot be satisfied, and hence a further improvement has been required.

Some aspects according to the present invention provide a binder for an all-solid-state secondary battery, which can suppress binder migration in a production process for an electrode of an all-solid-state secondary battery, leading to satisfactory binding properties and flexibility of the resultant electrode, and to excellent lithium ion conductivity, and by extension, can achieve a satisfactory cycle life characteristic, and a binder composition for an all-solid-state secondary battery containing the binder.

Solution to Problem

The present invention has been made in order to solve at least part of the above-mentioned problems, and can be realized as any one of the following aspects.

According to one aspect of the present invention, there is provided a binder for an all-solid-state secondary battery, including a conjugated diene-based polymer (A) that: has a conjugated diene unit based on a conjugated diene compound; and has a solubility parameter (SP value) of 16.80 $MPa^{1/2}$ or more and 17.80 $MPa^{1/2}$ or less.

In the binder for an all-solid-state secondary battery according to the one aspect, the conjugated diene-based polymer (A) may have a value α, which is represented by the following equation (i), of less than 0.7, where "p", "q", "r", and "s" represent constituent ratios (molar ratios) of a structural unit represented by the following formula (1), a structural unit represented by the following formula (2), a structural unit represented by the following formula (3), and a structural unit represented by the following formula (4) in the polymer, respectively.

$$\alpha = (p + (0.5 \times r))/(p + q + (0.5 \times r) + s) \quad (i)$$

(1)

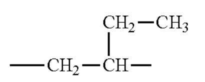

(2)

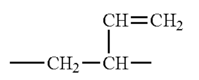

(3)

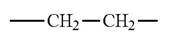

(4)

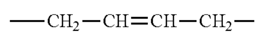

In the binder for an all-solid-state secondary battery according to any one of the above-mentioned aspects, the conjugated diene-based polymer (A) may further have an aromatic vinyl unit based on an aromatic vinyl compound.

In the binder for an all-solid-state secondary battery according to any one of the above-mentioned aspects, the conjugated diene-based polymer (A) may have a bound styrene content of from 5% to 40%.

In the binder for an all-solid-state secondary battery according to any one of the above-mentioned aspects, the conjugated diene-based polymer (A) may have a unit based on a modifier containing at least one kind of atom selected from the group consisting of: a nitrogen atom; an oxygen atom; a silicon atom; a germanium atom; and a tin atom.

According to one aspect of the present invention, there is provided a binder composition for an all-solid-state secondary battery, including: the binder for an all-solid-state secondary battery of any one of the above-mentioned aspects; and a liquid medium (B), wherein an absolute value $|SP_{diff}|=|SP_P-SP_S|$ of a difference between the solubility parameter $SP_P$ of the conjugated diene-based polymer (A) and a solubility parameter $SP_S$ of the liquid medium (B) is 1.5 or less.

In the binder composition for an all-solid-state secondary battery according to the one aspect, the liquid medium (B) may be at least one kind selected from the group consisting of: an aliphatic hydrocarbon; an alicyclic hydrocarbon; an aromatic hydrocarbon; ketones; esters; and ethers.

In the binder composition for an all-solid-state secondary battery according to any one of the above-mentioned aspects, the conjugated diene-based polymer (A) may be dissolved in the liquid medium (B).

According to one aspect of the present invention, there is provided a slurry for an all-solid-state secondary battery, including: the binder composition for an all-solid-state secondary battery of any one of the above-mentioned aspects; and a solid electrolyte.

The slurry for an all-solid-state secondary battery according to the one aspect may include, as the solid electrolyte, a sulfide-based solid electrolyte or an oxide-based solid electrolyte.

According to one aspect of the present invention, there is provided an all-solid-state secondary battery, including at least: a positive electrode active material layer; a solid electrolyte layer; and a negative electrode active material layer, wherein at least any one of the positive electrode active material layer, the solid electrolyte layer, and the negative electrode active material layer is a layer formed by applying and drying the slurry for an all-solid-state secondary battery of any one of the above-mentioned aspects.

According to one aspect of the present invention, there is provided a solid electrolyte sheet for an all-solid-state secondary battery, including: a substrate; and a layer formed on the substrate by applying and drying the slurry for an all-solid-state secondary battery of any one of the above-mentioned aspects.

According to one aspect of the present invention, there is provided an all-solid-state secondary battery, including at least: a positive electrode active material layer; a solid electrolyte layer; and a negative electrode active material layer, wherein at least any one of the positive electrode active material layer, the solid electrolyte layer, and the negative electrode active material layer is a layer formed of the solid electrolyte sheet for an all-solid-state secondary battery of the one aspect.

According to one aspect of the present invention, there is provided a method of producing a solid electrolyte sheet for an all-solid-state secondary battery, including a step including applying the slurry for an all-solid-state secondary battery of any one of the above-mentioned aspects onto a substrate and drying the slurry.

According to one aspect of the present invention, there is provided a method of producing an all-solid-state secondary battery, including producing an all-solid-state secondary battery via the method of producing a solid electrolyte sheet for an all-solid-state secondary battery of the one aspect.

Advantageous Effects of Invention

The binder for an all-solid-state secondary battery according to the present invention can effectively suppress binder migration in the production process for an electrode of an all-solid-state secondary battery, leading to satisfactory binding properties and flexibility of the electrode, and to excellent lithium ion conductivity. By extension, the use of the binder for an all-solid-state secondary battery according to the present invention provides an excellent effect of being capable of achieving a satisfactory cycle life characteristic.

DESCRIPTION OF EMBODIMENTS

Preferred embodiments of the present invention are described in detail below. It should be appreciated that the present invention is not limited to the embodiments described below, and includes various modification examples performed within the range not changing the gist of the present invention. Herein, ". . . (meth)acrylate" is a concept comprehending both of ". . . acrylate" and ". . . methacrylate".

Herein, a numerical range described like "from X to Y" is to be construed to include a numerical value X as a lower limit value and a numerical value Y as an upper limit value.

1. Binder for all-Solid-State Secondary Battery

A binder for an all-solid-state secondary battery according to one embodiment of the present invention includes a conjugated diene-based polymer (A) that: has a conjugated diene unit based on a conjugated diene compound; and has a solubility parameter (SP value) of 16.80 $MPa^{1/2}$ or more and 17.80 $MPa^{1/2}$ or less.

A method of producing the conjugated diene-based polymer (A) and the physical properties of the conjugated diene-based polymer (A) are described below in the stated order.

1.1. Method of Producing Conjugated Diene-Based Polymer (A)

The conjugated diene-based polymer (A) may be produced by, for example, a method including: a step of polymerizing the conjugated diene compound to obtain a conjugated diene-based polymer having an active end (polymerization step); and a step of modifying the end of the obtained conjugated diene-based polymer (modification step). In addition, the method may include a step of adding a reaction terminator (reaction termination step) or a step of hydrogenating the conjugated diene-based polymer (hydrogenation step), or both thereof. Specifically, the conjugated diene-based polymer (A) may be produced in accordance with a method described in WO 2014/133097 A1 with changes appropriately made in molecular weight, amount of the aromatic vinyl compound, vinyl bond content, hydrogenation ratio, kind of modifier, and the like so as to fit the intended use. The method of producing the conjugated diene-based polymer (A) is described in detail below.

<Polymerization Step>

The polymerization step is a step of polymerizing monomers including the conjugated diene compound to obtain a conjugated diene-based polymer having an active end. Any of a solution polymerization method, a vapor phase polymerization method, and a bulk polymerization method may be used as a polymerization method for obtaining the conjugated diene-based polymer, but the solution polymerization method is particularly preferred. In addition, any of a batch system and a continuous system may be used as a mode of polymerization. When the solution polymerization method is used, a specific example of the polymerization method is a method involving polymerizing monomers including the conjugated diene compound in an organic solvent in the presence of a polymerization initiator and a vinyl control agent (hereinafter sometimes referred to as "randomizer") which is used as required.

As the conjugated diene compound, in addition to 1,3-butadiene, a conjugated diene compound other than 1,3-butadiene may be used. Such conjugated diene compound is not particularly limited as long as the compound is copolymerizable with 1,3-butadiene and an aromatic vinyl compound, and examples thereof include isoprene, 2,3-dimethyl-1,3-butadiene, and 1,3-pentadiene. Of those, isoprene is preferred as the conjugated diene compound other than 1,3-butadiene. The conjugated diene compounds may be used alone or in combination thereof.

The conjugated diene-based polymer (A) may further have an aromatic vinyl unit based on an aromatic vinyl compound. Examples of the aromatic vinyl compound include styrene, divinylbenzene, 2-methylstyrene, 3-methylstyrene, 4-methylstyrene, α-methylstyrene, N,N-dimethylaminoethylstyrene, and diphenylethylene. Of those, one or more kinds of compounds selected from styrene and divinylbenzene are particularly preferred as the aromatic vinyl compound. The aromatic vinyl compounds may be used alone or in combination thereof.

The conjugated diene-based polymer (A) to be obtained through the polymerization step may be a copolymer of 1,3-butadiene and the aromatic vinyl compound, or may be a copolymer of 1,3-butadiene, the conjugated diene compound other than 1,3-butadiene, and the aromatic vinyl compound. In order to have a high living property in anionic polymerization, the conjugated diene-based polymer (A) is preferably a copolymer using 1,3-butadiene and styrene.

The order in which the structural units of the conjugated diene-based polymer (A) are arranged is not particularly limited. That is, the conjugated diene-based polymer (A) may be a block copolymer, or may be a random copolymer.

When the conjugated diene-based polymer to be obtained through the polymerization step is a copolymer of the conjugated diene compound and the aromatic vinyl compound, the content of the aromatic vinyl compound is preferably from 5 mass % to 40 mass %, more preferably from 8 mass % to 30 mass %, particularly preferably from 10 mass % to 27 mass % with respect to the total amount of the monomers used for the polymerization. In addition, when the content of the aromatic vinyl compound is set to fall within the above-mentioned ranges, the adhesiveness and flexibility of an electrode are both improved in some cases. The monomers to be used for the production of the conjugated diene-based polymer before hydrogenation preferably include 60 mass % to 95 mass % of butadiene, 5 mass % to 40 mass % of the aromatic vinyl compound, and 0 mass % to 35 mass % of the conjugated diene compound other than butadiene. The adoption of such blending amounts is preferred because the adhesiveness and flexibility of an electrode can both be achieved.

A monomer other than the conjugated diene compound and the aromatic vinyl compound may be used in the polymerization. Examples of the other monomer include acrylonitrile, methyl (meth)acrylate, and ethyl (meth)acrylate. The use amount of the other monomer is preferably 20 mass % or less, more preferably 18 mass % or less, particularly preferably 15 mass % or less with respect to the total amount of the monomers to be used for the polymerization.

At least any one of an alkali metal compound and an alkaline earth metal compound may be used as the polymerization initiator. A compound that is generally used as an initiator for anionic polymerization may be used as each of the alkali metal compound and the alkaline earth metal compound, and examples thereof include alkyllithiums, such as methyllithium, ethyllithium, n-propyllithium, n-butyllithium, sec-butyllithium, and tert-butyllithium, 1,4-dilithiobutane, phenyllithium, stilbenelithium, naphthyllithium, naphthylsodium, naphthylpotassium, di-n-butylmagnesium, di-n-hexylmagnesium, ethoxypotassium, and calcium stearate. Of those, a lithium compound is preferred.

In addition, the polymerization reaction may be performed in the presence of a compound (hereinafter sometimes referred to as "compound (R)") obtained by mixing at least any one of the alkali metal compound and the alkaline earth metal compound with a compound for introducing a functional group that interacts with a current collector, a solid electrolyte, or the like into a polymerization initiation end (hereinafter sometimes referred to as "compound (C1)"). When the polymerization is performed in the presence of the compound (R), the functional group that interacts with a current collector, a solid electrolyte, or the like can be introduced into the polymerization initiation end of the conjugated diene-based polymer. Herein, the "interaction" means the formation of a covalent bond between molecules, or the formation of an intermolecular force weaker than a covalent bond (e.g., an electromagnetic force acting between molecules, such as an ion-dipole interaction, a dipole-dipole interaction, a hydrogen bond, or a van der Waals force). In addition, the "functional group that interacts with a current collector, a solid electrolyte, or the like" refers to a group containing at least one atom, such as a nitrogen atom, an oxygen atom, a silicon atom, a sulfur atom, or a phosphorus atom.

The above-mentioned compound (C1) is not particularly limited as long as the compound has a partial structure in which a nitrogen atom, an oxygen atom, a silicon atom, a sulfur atom, or a phosphorus atom is directly bonded to a hydrogen atom. As the compound (C1), there may be used, for example, a nitrogen-containing compound such as a secondary amine, a compound having a hydroxy group, a silicon-containing compound such as a tertiary silane, a compound having a thiol group, or a compound such as a secondary phosphine. Of those, a nitrogen-containing compound such as a secondary amine is preferred. Specific examples of the nitrogen-containing compound include dimethylamine, diethylamine, dipropylamine, dibutylamine, dipentylamine, dihexylamine, dioctylamine, dodecamethyleneimine, N,N'-dimethyl-N'-trimethylsilyl-1,6-diaminohexane, piperidine, 3,3-dimethylpiperidine, 2,6-dimethylpiperidine, 1-methyl-4-(methylamino)piperidine, 2,2,6,6-tetramethylpiperidine, pyrrolidine, piperazine, 2,6-dimethylpiperazine, 1-ethylpiperazine, 2-methylpiperazine, 1-benzylpiperazine, 2,6-dimethylmorpholine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, N'-[2-N,N-bis(trimethylsilyl) aminoethyl]piperazine, 1,3-ditrimethylsilyl-1,3,5-triazinane, 5-benzyloxyindole, and 3-azaspiro[5,5] undecane.

The above-mentioned compound (R) is, in particular, preferably a reaction product between a lithium compound such as an alkyllithium and the compound (C1). When the polymerization is performed in the presence of the compound (R), the polymerization may be performed by mixing the alkali metal compound or the alkaline earth metal compound with the compound (C1) in advance to prepare the compound (R), and adding the prepared compound (R) into the polymerization system. Alternatively, the polymerization may be performed as follows: the alkali metal compound or the alkaline earth metal compound, and the compound (C1) are added into the polymerization system, and are mixed with each other in the polymerization system to prepare the compound (R).

The randomizer may be used for the purpose of, for example, adjusting a content ratio of the vinyl bonds (1,2-vinyl bond content). Examples of the randomizer include dimethoxybenzene, tetrahydrofuran, dimethoxyethane, ethylene glycol diethyl ether, ethylene glycol dibutyl ether, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. Those randomizers may be used alone or in combination thereof.

The organic solvent to be used for the polymerization only needs to be an organic solvent inert to the reaction, and for example, an aliphatic hydrocarbon, an alicyclic hydrocarbon, or an aromatic hydrocarbon may be used. Of those, a hydrocarbon having 3 to 8 carbon atoms is preferred, and specific examples thereof include n-pentane, isopentane, n-hexane, n-heptane, cyclohexane, propene, 1-butene, isobutene, trans-2-butene, cis-2-butene, 1-pentyne, 2-pentyne, 1-hexene, 2-hexene, benzene, toluene, xylene, ethylbenzene, cyclopentane, methylcyclopentane, methylcyclohexane, 1-pentene, 2-pentene, and cyclohexene. The organic solvents may be used alone or in combination thereof.

When solution polymerization is used, the concentration of the monomers in the reaction solvent is preferably from 5 mass % to 50 mass %, more preferably from 10 mass % to 30 mass % because a balance between productivity and ease of polymerization control can be maintained. The temperature of the polymerization reaction is preferably from −20° C. to 150° C., more preferably from 0° C. to 120° C., particularly preferably from 20° C. to 100° C. In addition, the polymerization reaction is preferably performed under a pressure sufficient for keeping the monomers substantially in a liquid phase. Such pressure may be obtained by a method involving, for example, pressurizing the inside of a reactor with a gas inert to the polymerization reaction.

With regard to the conjugated diene-based polymer to be obtained through the polymerization described above, a 1,2-vinyl bond content in the structural unit derived from butadiene is preferably from 5 mass % to 70 mass %, more preferably from 10 mass % to 65 mass %, particularly preferably from 20 mass % to 60 mass %. When the 1,2-vinyl bond content is 5 mass % or more, adhesiveness tends to be increased, and when the 1,2-vinyl bond content is 70 mass % or less, lithium ion conductivity and a cycle life characteristic tend to be easily improved. The 1,2-vinyl bond content is a value measured by $^1H$-NMR.

When the conjugated diene-based polymer before hydrogenation is a copolymer of the conjugated diene compound and the aromatic vinyl compound, the copolymer preferably has a random copolymerization moiety of the conjugated diene unit based on the conjugated diene compound and the aromatic vinyl unit based on the aromatic vinyl compound. The presence of such specific random copolymerization moiety is suitable because the dispersibility of an active material and a solid electrolyte can be made more satisfactory.

<Modification Step>

The modification step is a step of allowing the active end of the conjugated diene-based polymer obtained through the polymerization step described above to react with a compound for introducing a functional group that interacts with a current collector, a solid electrolyte, or the like into a polymerization termination end (hereinafter sometimes referred to as "compound (C2)"). Through this step, the functional group that interacts with a current collector, a solid electrolyte, or the like can be introduced into the polymerization termination end of the conjugated diene-based polymer. As used herein, the term "active end" means a moiety other than a structure derived from a monomer having a carbon-carbon double bond (more specifically a carbon anion) present at the end of a molecular chain.

As long as the conjugated diene-based polymer to be used for the modification reaction in this step (hereinafter sometimes referred to as "end modification reaction") has an active end, its polymerization initiation end may be unmodified or modified. The compound (C2) is not particularly limited as long as the compound is capable of reacting with the active end of the conjugated diene-based polymer, but is preferably a compound that has one or more kinds of functional groups selected from the group consisting of: an amino group; a group having a carbon-nitrogen double bond; a nitrogen-containing heterocyclic group; a phosphino group; an epoxy group; a thioepoxy group; a protected hydroxy group; a protected thiol group; and a hydrocarbyloxysilyl group, and that is capable of reacting with a polymerization active end. Specifically, at least one kind selected from the group consisting of: a compound represented by the following general formula (5); and a compound represented by the following general formula (6) may be preferably used as the compound (C2).

(5)

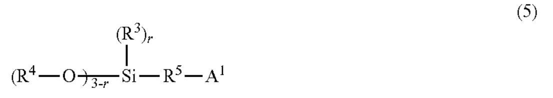

In the formula (5), $A^1$ represents a monovalent functional group having at least one kind of atom selected from the group consisting of: nitrogen; phosphorus; oxygen; sulfur; and silicon, and being bonded to $R^5$ through the nitrogen atom, the phosphorus atom, the oxygen atom, the sulfur atom, the silicon atom, or a carbon atom contained in a carbonyl group, or represents a (thio)epoxy group. $R^3$ and $R^4$ each represent a hydrocarbyl group, $R^5$ represents a hydrocarbylene group, and "r" represents an integer of from 0 to 2. When a plurality of R's or $R^4$s are present, the plurality of $R^3$s or $R^4$s may be identical to or different from each other.

(6)

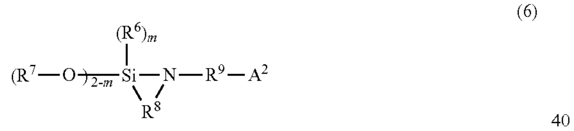

In the formula (6), $A^2$ represents a monovalent functional group having at least one kind of atom selected from the group consisting of: nitrogen; phosphorus; oxygen; sulfur; and silicon, having no active hydrogen, and being bonded to $R^9$ through the nitrogen atom, the phosphorus atom, the oxygen atom, the sulfur atom, or the silicon atom. $R^6$ and $R^7$ each independently represent a hydrocarbyl group, $R^8$ and $R^9$ each independently represent a hydrocarbylene group, and "m" represents 0 or 1. When a plurality $R^7$s are present, the plurality of $R^7$s may be identical to or different from each other.

In the formula (5) and the formula (6), the hydrocarbyl group of each of $R^3$, $R^4$, $R^6$, and $R^7$ is preferably a linear or branched alkyl group having 1 to 20 carbon atoms, a cycloalkyl group having 3 to 20 carbon atoms, or an aryl group having 6 to 20 carbon atoms. The hydrocarbylene group of each of $R^5$, $R^8$, and $R^9$ is preferably a linear or branched alkanediyl group having 1 to 20 carbon atoms, a cycloalkylene group having 3 to 20 carbon atoms, or an arylene group having 6 to 20 carbon atoms. "r" and "m" each preferably represent 0 or 1 because reactivity with the active end can be increased.

When $A^1$ represents the above-mentioned monovalent functional group, it is preferred that the at least one kind of atom selected from the group consisting of: nitrogen; phosphorus; oxygen; sulfur; and silicon that $A^1$ has be not bonded to active hydrogen and be protected with a protecting group (e.g., a trisubstituted hydrocarbylsilyl group). In addition, it is preferred that the at least one kind of atom selected from the group consisting of: nitrogen; phosphorus; oxygen; sulfur; and silicon that $A^2$ has be not bonded to active hydrogen and be protected with a protecting group (e.g., a trisubstituted hydrocarbylsilyl group). As used herein, the term "active hydrogen" refers to a hydrogen atom bonded to an atom other than a carbon atom, and preferably refers to one having lower bond energy than a carbon-hydrogen bond of polymethylene. The "protecting group" is a functional group for converting $A^1$ or $A^2$ into a functional group inert to a polymerization active end. The term "(thio)epoxy group" is meant to encompass an epoxy group and a thioepoxy group.

$A^1$ may represent a group capable of forming an onium ion with an onium salt generator. When the compound (C2) has such group ($A^1$), excellent adhesiveness can be imparted to the conjugated diene-based polymer. Specific examples of $A^1$ include: a nitrogen-containing group obtained by substituting two hydrogen atoms of a primary amino group with two protecting groups; a nitrogen-containing group obtained by substituting one hydrogen atom of a secondary amino group with one protecting group; a tertiary amino group; an imino group; a pyridyl group; a phosphorus-containing group obtained by substituting two hydrogen atoms of a primary phosphino group with two protecting groups; a phosphorus-containing group obtained by substituting one hydrogen atom of a secondary phosphino group with one protecting group; a tertiary phosphino group; an epoxy group; a group in which the hydrogen atom of a hydroxy group is protected with a protecting group; a thioepoxy group; a sulfur-containing group obtained by substituting the hydrogen atom of a thiol group with a protecting group; and a hydrocarbyloxycarbonyl group. Of those, a group having a nitrogen atom is preferred because of having satisfactory affinity for a solid electrolyte and an active material, and a tertiary amino group or a nitrogen-containing group obtained by substituting two hydrogen atoms of a primary amino group with two protecting groups is more preferred.

Preferred specific examples of the compound (C2) may include dibutyldichlorosilicon, methyltrichlorosilicon, dimethyldichlorosilicon, tetrachlorosilicon, triethoxymethylsilane, triphenoxymethylsilane, trimethoxysilane, methyltriethoxysilane, the compound represented by the general formula (5), and the compound represented by the general formula (6). Examples of the compound represented by the general formula (5) may include N,N-bis(trimethylsilyl)aminopropyltrimethoxysilane, N,N-bis(trimethylsilyl)aminopropylmethyldiethoxysilane, N-trimethylsilyl-N-methylaminopropylmethyldiethoxysilane, [3-(N,N-dimethylamino)propyl]trimethoxysilane, N,N',N'-tris(trimethylsilyl)-N-(2-aminoethyl)-3-aminopropyltriethoxysilane, 3-(4-trimethylsilyl-1-piperazino)propylmethyldimethoxysilane, 3-glycidoxypropylmethyldimethoxysilane, and 3-glycidoxypropyltriethoxysilane. In addition, examples of the compound represented by the general formula (6) may include 2,2-dimethoxy-1-(3-trimethoxysilylpropyl)-1,2-azasilolidine, 2,2-dimethoxy-1-phenyl-1,2-azasilolidine, 1-trimethylsilyl-2,2-dimethoxy-1-aza-2-silacyclopentane, and 2,2-dimethoxy-8-(4-methylpiperazinyl)methyl-1,6-dioxa-2-silacyclooctane. The compounds (C2) may be used alone or in combination thereof.

In addition, other than the compound (C2), for example, a germane compound or a stannane compound may also be suitably used in the modification step. When those compounds are used, a germanium atom or a tin atom can be introduced into the conjugated diene-based polymer (A). Herein, the compound group consisting of the compound (R), the compound (C2), the germane compound, and the stannane compound is sometimes referred to as "modifier".

Examples of the germane compound include: alkoxygermane compounds, such as a monoalkoxygermane compound, a dialkoxygermane compound, a trialkoxygermane compound, and a tetraalkoxygermane compound; and a halogenated triorganogermane compound, a dihalogenated diorganogennane compound, a trihalogenated organogermane compound, and a tetrahalogenated germane compound. The examples of the germane compound also include the same compounds as those given as the examples of the silane compound except that the compounds each have a germanium atom instead of the silicon atom.

Examples of the stannane compound include: alkoxystannane compounds, such as a monoalkoxystannane compound, a dialkoxystannane compound, a trialkoxystannane compound, and a tetraalkoxystannane compound; and a halogenated triorganostannane compound, a dihalogenated diorganostannane compound, a trihalogenated organostannane compound, and a tetrahalogenated stannane compound. The examples of the stannane compound also include the same compounds as those given as the examples of the silane compound except that the compounds each have a tin atom instead of the silicon atom.

Specific examples of those stannane compounds may include, as preferred examples, tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichlorostannyl) butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, and dibutyltin bislaurate. Of those, tetrachlorotin ($SnCl_4$) is particularly preferably used.

The above-mentioned end modification reaction may be performed, for example, as a solution reaction. The solution reaction may be performed using a solution containing an unreacted monomer after the termination of the polymerization reaction in the polymerization step described above, or may be performed after the conjugated diene-based polymer contained in the solution has been isolated and dissolved in an appropriate solvent such as cyclohexane. In addition, the end modification reaction may be performed using any of a batch system and a continuous system. In this case, a method of adding the compound (C2), the germane compound, or the stannane compound is not particularly limited, and examples thereof include a method involving adding the compound in one portion, a method involving adding the compound in divided portions, and a method involving continuously adding the compound.

The amount of the compound (C2), the germane compound, or the stannane compound to be used for the end modification reaction only needs to be appropriately set in accordance with the kind of the compound to be used for the reaction, but is preferably 0.1 molar equivalent or more, more preferably 0.3 molar equivalent or more with respect to the metal atom to be involved in the polymerization reaction that the polymerization initiator has. When the use amount is set to 0.1 molar equivalent or more, the modification reaction can be caused to proceed sufficiently, and hence the dispersion stability of a slurry can be suitably improved.

The temperature of the end modification reaction is generally the same as the temperature of the polymerization reaction, and is preferably from −20° C. to 150° C., more preferably from 0° C. to 120° C., particularly preferably from 20° C. to 100° C. When the temperature of the modification reaction is low, the viscosity of the modified conjugated diene-based polymer tends to be increased. Meanwhile, when the temperature of the modification reaction is high, the polymerization active end is liable to be deactivated. The reaction time of the modification reaction is preferably from 1 minute to 5 hours, more preferably from 2 minutes to 1 hour.

As described above, the conjugated diene-based polymer (A) preferably has a unit based on a modifier containing at least one kind of atom selected from the group consisting of a nitrogen atom; an oxygen atom; a silicon atom; a germanium atom; and a tin atom. When the conjugated diene-based polymer (A) has the unit based on such modifier, the dispersion stability of a slurry becomes more satisfactory, and hence moldability in a pressure-molded body for an all-solid-state secondary battery becomes satisfactory. Consequently, an all-solid-state secondary battery that is excellent in lithium ion conductivity and has a satisfactory cycle life characteristic is obtained.

<Reaction Termination Step>

The step of adding a reaction terminator (hereinafter sometimes referred to as "reaction termination step") may be performed after the modification step. The reaction termination step is a step of protonating, with a reaction terminator, the active end remaining without reacting with the modifier in the modification reaction, and this reaction is sometimes referred to as "termination reaction". Hydrogen, a compound having a hydroxy group, a compound having a primary amino group, a compound having a secondary amino group, or the like may be used as the reaction terminator. Of those, hydrogen or a compound having a hydroxy group may be suitably used. Specific examples of the compound having a hydroxy group include methanol, ethanol, 1-propanol, 2-propanol, 1-butanol, 2-butanol, 2-methyl-1-propanol, 2-methyl-2-propanol, 1-pentanol, 1-hexanol, 1-heptanol, and 1-octanol.

The above-mentioned termination reaction may be performed, for example, as a solution reaction. The solution reaction may be performed using a solution containing an unreacted monomer after the termination of the modification reaction in the modification step described above, or may be performed after the conjugated diene-based polymer contained in the solution has been isolated and dissolved in an appropriate solvent such as cyclohexane. In addition, the termination reaction may be performed using any of a batch system and a continuous system. In this case, a method of adding the reaction terminator is not particularly limited, and examples thereof include a method involving adding the reaction terminator in one portion, a method involving adding the reaction terminator in divided portions, and a method involving continuously adding the reaction terminator.

The temperature of the termination reaction is generally the same as the temperature of the polymerization reaction or the modification reaction, and is preferably from −20° C. to 150° C., more preferably from 0° C. to 120° C., particularly preferably from 20° C. to 100° C. In addition, the reaction time of the termination reaction is preferably from 1 minute to 5 hours, more preferably from 2 minutes to 1 hour.

After the above-mentioned reaction termination step, an anti-aging agent may be added. The addition of the anti-aging agent can prevent the gelation and deterioration of the conjugated diene-based polymer (A) due to heat, light, and oxidative deterioration in a solvent removal step by steam stripping and a drying step with a heat roll, which are performed after the synthesis of the conjugated diene-based polymer (A), and subsequent long-term storage as a bale.

Examples of the anti-aging agent include compounds, such as a phenol-based anti-aging agent, an amine-based anti-aging agent, a quinone-based anti-aging agent, a phosphorus-based anti-aging agent, a sulfur-based anti-aging agent, and a phenothiazine-based anti-aging agent. Of those, a phenol-based anti-aging agent or an amine-based anti-aging agent is preferred. Those anti-aging agents may be used alone or in combination thereof.

Examples of the phenol-based anti-aging agent include p-methoxyphenol, 2,6-di-tert-butyl-p-cresol, phenol, hydroquinone, p-cresol, butylated hydroxyanisole, propyl gallate, chlorogenic acid, catechin, caffeic acid, genkwanin, luteolin, tocopherol, catechol, resorcinol, 1,4-dihydroxynaphthalene, 1,5-dihydroxynaphthalene, pyrogallol, 4,4'-butylidenebis(6-tert-butyl-m-cresol), 2,2'-methylenebis(4-methyl-6-tert-butylphenol), 2,2'-methylenebis(6-tert-butyl-4-ethylphenol), 4,4'-thiobis(6-tert-butyl-m-cresol), 2,5-di-tert-amylhydroquinone, styrenated phenol, 2,5-di-tert-butylhydroquinone, 2-methyl-4,6-bis[(n-octylthio)methyl] phenol, 2,4-bis(dodecylthiomethyl)-6-methylphenol, 2-tert-butyl-6-(3-tert-butyl-2-hydroxy-5-methylbenzyl)-4-methylphenyl acrylate, and 2-[1-(2-hydroxy-3,5-di-tert-pentylphenyl)ethyl]-4,6-di-tert-pentylphenyl acrylate.

Examples of the amine-based anti-aging agent include aromatic amines, such as 1-naphthylamine, 2-naphthylamine, phenylenediamine, 4,4'-diaminobenzophenone, 4,4'-bis (dimethylamino)benzophenone, N-isopropyl-N'-phenylbenzene-1,4-diamine, N-(1,3-dimethylbutyl)-N'-phenyl-1,4-phenylenediamine, a 2,2,4-trimethyl-1,2-dihydroquinoline polymer, and 6-ethoxy-2,2,4-trimethyl-1,2-dihydroquinoline. In addition, a light stabilizer (HALS), a hindered amine compound, a nitroxyl radical (2,2,6,6-tetramethylpiperidine 1-oxyl (TEMPO)), or the like may also be preferably used as the amine-based anti-aging agent.

An example of the phosphorus-based anti-aging agent is a phosphite compound. A thiol compound or a sulfide compound such as pentaerythrityl tetrakis(3-laurylthiopropionate) may be used as the sulfur-based anti-aging agent.

The above-mentioned anti-aging agent may be added in any one of a solid state, a molten state, or a solution state of being dissolved in a solvent capable of dissolving the anti-aging agent. The state of the conjugated diene-based polymer (A) at the time of the addition of the anti-aging agent may be any of a solid state or a solution state, but is preferably a solution state from the viewpoint of the dispersibility of the anti-aging agent.

When the conjugated diene-based polymer (A) contains the anti-aging agent, the lower limit of the content ratio of the anti-aging agent is preferably 0.05 part by mass, more preferably 0.1 part by mass, particularly preferably 0.2 part by mass with respect to 100 parts by mass of the conjugated diene-based polymer (A). In addition, the upper limit of the content ratio of the anti-aging agent is preferably 2 parts by mass, more preferably 1.5 parts by mass, particularly preferably 1.2 parts by mass.

<Hydrogenation Step>

The conjugated diene-based polymer (A) may be a product obtained by hydrogenating the modified or unmodified conjugated diene-based polymer obtained in the foregoing. Any method and conditions may be used as a method and conditions for the hydrogenation reaction as long as a conjugated diene-based polymer having a desired hydrogenation ratio can be obtained. Examples of such hydrogenation method include: a method involving using, as a hydrogenation catalyst, a catalyst containing an organic metal compound of titanium as a main component; a method involving using a catalyst formed of an organic compound of iron, nickel, or cobalt and an organic metal compound such as an alkylaluminum; a method involving using an organic complex of an organic metal compound of ruthenium, rhodium, or the like; and a method involving using a catalyst obtained by supporting a metal, such as palladium, platinum, ruthenium, cobalt, or nickel, on a support, such as carbon, silica, or alumina. Of the various methods, a method involving performing hydrogenation under the mild conditions of a low pressure and a low temperature using an organic metal compound of titanium alone or a uniform catalyst formed of an organic metal compound of titanium and an organic metal compound of lithium, magnesium, or aluminum (JP 63-4841 B2, JP 01-37970 B2, JP 2000-037632 A) is industrially preferred, and also has high hydrogenation selectivity for the double bond of butadiene, thereby being suited for the purpose of the present invention.

The hydrogenation reaction of the modified conjugated diene-based polymer is performed in a solvent which is inert to the catalyst and in which the conjugated diene-based polymer is soluble. The solvent is preferably any one of aliphatic hydrocarbons, such as n-pentane, n-hexane, n-heptane, and n-octane, alicyclic hydrocarbons, such as cyclohexane and cycloheptane, aromatic hydrocarbons, such as benzene and toluene, and ethers, such as diethyl ether and tetrahydrofuran, or a mixture containing any one of the above-mentioned compounds as a main component.

The hydrogenation reaction is generally performed by keeping the conjugated diene-based polymer under a hydrogen or inert atmosphere at a predetermined temperature, adding a hydrogenation catalyst under stirring or under no stirring, and then introducing a hydrogen gas for pressurization to a predetermined pressure. The "inert atmosphere" means an atmosphere that does not react with the participants of the hydrogenation reaction, and examples thereof include helium, neon, and argon. Air or oxygen causes deactivation of the catalyst by, for example, oxidizing the catalyst, and hence is not preferred. In addition, nitrogen acts as a catalyst poison at the time of the hydrogenation reaction to reduce hydrogenation activity, and hence is not preferred. In particular, the inside of a hydrogenation reactor is most suitably an atmosphere of a hydrogen gas alone.

Any of a batch process, a continuous process, and a combination thereof may be used as a hydrogenation reaction process for obtaining a hydrogenated conjugated diene-based polymer. In addition, when a titanocene diaryl-based compound is used as the hydrogenation catalyst, the compound may be added alone as it is to a reaction solution, or may be added as a solution in an inert organic solvent. Any of various solvents that do not react with the participants of the hydrogenation reaction may be used as the inert organic solvent to be used in the case of using the catalyst as a solution. The same solvent as the solvent to be used for the hydrogenation reaction is preferred. In addition, the addition amount of the catalyst is from 0.02 mmol to 20 mmol per 100 g of the conjugated diene-based polymer before hydrogenation.

A suitable method for obtaining the conjugated diene-based polymer (A) involves subjecting monomers including butadiene to solution polymerization in the presence of an alkali metal compound, and performing the modification step using the resultant polymer solution as it is. This method is industrially useful. In addition, the method may include the reaction termination step or the hydrogenation step, or both thereof, after the modification step. In those cases, the conjugated diene-based polymer (A) is obtained by removing the solvent from the solution obtained in the foregoing and isolating the conjugated diene-based polymer (A). The isolation of the conjugated diene-based polymer (A) may be performed by, for example, a known solvent removal method such as steam stripping and a drying operation such as heat treatment.

In order to make the dispersion stability of a slurry and the adhesiveness of an electrode more satisfactory, the conjugated diene-based polymer (A) preferably has one or more kinds of functional groups selected from the group consisting of: an amino group; a nitrogen-containing heterocyclic group; a phosphino group; a hydroxy group; a thiol group; and a hydrocarbyloxysilyl group, and more preferably has one or more kinds of functional groups selected from the group consisting of: an amino group; a nitrogen-containing heterocyclic group; and a hydrocarbyloxysilyl group. Any such functional group is particularly preferably introduced into an end of the conjugated diene-based polymer (A).

1.2. Physical Properties of Conjugated Diene-Based Polymer (A)

<Solubility Parameter (SP value)>

The "SP value" is sometimes referred to as "solubility parameter", and experimentally obtained SP values of various compounds are described in the literature and the like. In the present invention, conjugated diene-based polymers different from each other in composition are applicable, and hence the SP value of the conjugated diene-based polymer is calculated by applying mutatis mutandis a method involving calculating, from a literature value for the SP value of each homopolymer of the conjugated diene compound and/or the aromatic vinyl compound for forming the conjugated diene-based polymer, the SP value of a mixture thereof. Examples of the homopolymer of the conjugated diene compound include 1,4-polybutadiene, 1,2-polybutadiene, 1,4-polyisoprene, 1,2-polyisoprene, and 3,4-polyisoprene. Examples of the homopolymer of the aromatic vinyl compound include polystyrene and poly-α-methylstyrene. Herein, the same SP value is used for cis-1,4-polybutadiene and trans-1,4-polybutadiene.

The SP values of those homopolymers are described in, for example, Macromolecules, 2002, 35, 4030-4035 or J. Branderup, E. Immergut, E. Grulke, eds. "Polymer Handbook", 4th Ed., Wiley-Interscience, New York, 1999, Section VII, pp. 702-707.

The SP value ($\delta_{mix}$) of the mixture may be determined by the following equation.

$$\delta_{mix}=\Sigma(\varphi_i\times\delta_i)$$

In the equation, φ refers to a volume fraction in the mixture, and $\varphi_i$ represents the volume fraction of a component "i". δ refers to an SP value, and $\delta_i$ represents the SP value of the component "i".

The SP value of the conjugated diene-based polymer may be calculated by applying mutatis mutandis this method of determining the SP value of the mixture. Specifically, when the structural unit based on each monomer for forming the conjugated diene-based polymer (the conjugated diene unit or the aromatic vinyl unit) is designated as a monomer unit "i", $\delta_{mix}$ is determined with $\varphi_i$ representing the volume fraction of the monomer unit "i" and $\delta_i$ representing the SP value of the homopolymer of the monomer unit "i", and the $\delta_{mix}$ is adopted as the SP value of the conjugated diene-based polymer.

The volume fraction $\varphi_i$ may be calculated from the following equation: $\varphi_i=(x_i\times(1/Mn_i)\times Vm_i)/\Sigma(x_i\times(1/Mn_i)\times Vm_i)$ where "x" represents the weight fraction of each monomer unit, Mn represents the molar mass (g/mol) of the monomer unit, and Vm represents the molar volume ($cm^3$/mol) of the monomer unit.

For the Mn and Vm of the monomer unit, values according to "Materials Studio 2017 R2 Synthia" manufactured by Dassault Systemes Biovia K.K. are used unless otherwise stated. The Mn of a styrene unit is 104.152 g/mol, the Mn of a cis- or trans-butadiene unit is 54.092 g/mol, and the Mn of a 1,2-butadiene unit is 54.092 g/mol. The Vm of the styrene unit is 96.975 $cm^3$/mol, the Vm of the cis- or trans-butadiene unit is 59.074 $cm^3$/mol, and the Vm of the 1,2-butadiene unit is 58.260 $cm^3$/mol. In addition, the Mn of an ethylene unit is 28.054, and 33.03 $cm^3$/mol described in J. Branderup, E. Immergut, E. Grulke, eds. "Polymer Handbook", 4th Ed., Wiley-Interscience, New York, 1999, Section VII, pp. 704 was used as its Vm. The Mn of a butene unit is 56.108, and a molar molecular volume of 64.7 ($cm^3$/mol) determined by Fedors et al.'s estimation method (described in R. F. Fedors: Polym. Eng. Sci., 14(2), 147-154 (1974)) was used as its Vm. The weight fraction of each monomer unit may be determined by dividing the content of each monomer unit by the total of the contents of the monomer units in the conjugated diene-based polymer.

The SP value of a hydrogenated body was calculated on the assumption that a 1,2-butadiene structure and a 1,4-butadiene structure before hydrogenation were each hydrogenated at the proportion of its marked hydrogenation ratio and converted into a 1-butene structure and an ethylene structure, respectively.

The solubility parameter (SP value) of the conjugated diene-based polymer (A) is 16.80 $MPa^{1/2}$ or more and 17.80 $MPa^{1/2}$ or less. The lower limit value of the solubility parameter (SP value) of the conjugated diene-based polymer (A) is preferably 16.82 $MPa^{1/2}$, more preferably 16.84 $MPa^{1/2}$, particularly preferably 16.86 $MPa^{1/2}$. The upper limit value of the solubility parameter (SP value) of the conjugated diene-based polymer (A) is preferably 17.79 $MPa^{1/2}$, more preferably 17.78 $MPa^{1/2}$, particularly preferably 17.77 $MPa^{1/2}$. When the solubility parameter (SP value) of the conjugated diene-based polymer (A) is equal to or higher than the above-mentioned lower limit value, the dispersibility of an electrode active material and a solid electrolyte becomes satisfactory, and hence the dispersion stability of a slurry and the adhesiveness of an electrode can be improved to provide a satisfactory electrode. In addition, when the solubility parameter (SP value) of the conjugated diene-based polymer (A) is set to fall within the above-mentioned ranges, the solubility of the conjugated diene-based polymer (A) in a low-polarity or nonpolar solvent becomes satisfactory, and hence the segregation of the binder, that is, binder migration can be suppressed at the time of the application and drying of the slurry. In addition, the electrode to be obtained has appropriate flexibility, and hence a crack hardly occurs after application or after pressing. Further, adhesiveness and lithium ion conductivity also become satisfactory, and hence an electrode having satisfactory electrical storage device characteristics is obtained.

<Bound Styrene Content>

The lower limit value of the bound styrene content of the conjugated diene-based polymer (A) is preferably 5%, more preferably 8%, particularly preferably 10%. The upper limit value of the bound styrene content of the conjugated diene-based polymer (A) is preferably 40%, more preferably 30%, particularly preferably 27%. When the bound styrene content of the conjugated diene-based polymer (A) falls within the above-mentioned ranges, satisfactory adhesiveness and flexibility of an electrode can both be achieved. The bound styrene content may be measured by $^{1}$H-NMR measurement.

<Weight Average Molecular Weight>

The weight average molecular weight (Mw) of the conjugated diene-based polymer (A) is preferably from $1.0\times10^5$ to $2.0\times10^6$, more preferably from $1.0\times10^5$ to $1.5\times10^6$, particularly preferably from $1.5\times10^5$ to $1.0\times10^6$. When the weight average molecular weight (Mw) is equal to or higher than the above-mentioned lower limit values, the adhesiveness of an electrode tends to be easily improved. When the weight average molecular weight (Mw) is equal to or lower than the above-mentioned upper limit values, the flexibility of an electrode tends to be kept. As used herein, the term "weight average molecular weight (Mw)" refers to a weight average molecular weight in terms of polystyrene measured by gel permeation chromatography (GPC).

<Hydrogenation Ratio>

As described above, the conjugated diene-based polymer (A) may be hydrogenated. In such case, the conjugated diene-based polymer (A) has at least any one structural unit out of a structural unit represented by the following formula (1), a structural unit represented by the following formula (2), a structural unit represented by the following formula (3), and a structural unit represented by the following formula (4), and when their constituent ratios (molar ratios) in the polymer are represented by "p", "q", "r", and "s", respectively, a value α represented by the following equation (i) corresponds to the hydrogenation ratio of the conjugated diene-based polymer. With regard to a of the following equation (i), for example, when a is 0.7, the hydrogenation ratio of the conjugated diene-based polymer is 70%.

$$\alpha = (p + (0.5 \times r))/(p + q + (0.5 \times r) + s) \quad \text{(i)}$$

(1)

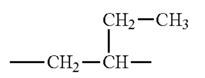

(2)

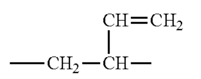

(3)

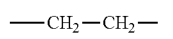

(4)

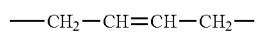

Although any value may be adopted as α, when α is set to less than 0.7, the dispersion stability of a slurry and the flexibility of an electrode are excellent, and besides, high lithium ion conductivity and a satisfactory cycle life characteristic can be achieved. For such reason, a is preferably less than 0.7, more preferably less than 0.6, particularly preferably less than 0.5. The hydrogenation ratio in the conjugated diene-based polymer may be adjusted on the basis of, for example, the period of time of the hydrogenation reaction or the supply amount of hydrogen. The hydrogenation ratio may be measured by $^{1}$H-NMR.

2. Binder Composition for all-Solid-State Secondary Battery

A binder composition for an all-solid-state secondary battery according to one embodiment of the present invention contains the above-mentioned binder for an all-solid-state secondary battery and a liquid medium (B). The components contained in the binder composition for an all-solid-state secondary battery according to this embodiment are described in detail below. The binder for an all-solid-state secondary battery has been described above, and hence detailed description thereof is omitted.

2.1. Liquid Medium (B)

The liquid medium (B) is not particularly limited, but there may be used, for example: aliphatic hydrocarbons, such as hexane, heptane, octane, decane, and dodecane; alicyclic hydrocarbons, such as cyclohexane, cycloheptane, cyclooctane, and cyclodecane; aromatic hydrocarbons, such as toluene, xylene, mesitylene, naphthalene, and tetralin; ketones, such as 3-pentanone, 4-heptanone, methyl hexyl ketone, and diisobutyl ketone; esters, such as butyl acetate, butyl butyrate, methyl butanoate, butyl pentanoate, butyl hexanoate, pentyl butyrate, pentyl pentanoate, pentyl hexanoate, hexyl butyrate, hexyl pentanoate, and hexyl hexanoate; and ethers, such as dibutyl ether, tetrahydrofuran, and anisole. Those solvents may be used alone or in combination thereof.

The content of the liquid medium (B) is preferably from 100 parts by mass to 10,000 parts by mass, more preferably from 150 parts by mass to 5,000 parts by mass, still more preferably from 200 parts by mass to 4,000 parts by mass, particularly preferably from 300 parts by mass to 3,000 parts by mass with respect to 100 parts by mass of the conjugated diene-based polymer (A). When the content of the liquid medium (B) is set to fall within the above-mentioned ranges, workability in the use of the binder composition for an all-solid-state secondary battery and a slurry for an all-solid-state secondary battery to be obtained therefrom can be improved.

<Solubility Parameter (SP Value)>

In the binder composition for an all-solid-state secondary battery according to this embodiment, the absolute value $|SP_{diff}|=|SP_P-SP_S|$ of a difference between the solubility parameter $SP_P$ of the conjugated diene-based polymer (A) and the solubility parameter $SP_S$ of the liquid medium (B) is 1.50 or less, preferably 1.45 or less, more preferably 1.40 or less, particularly preferably 1.35 or less. When $|SP_P-SP_S|$ falls within the above-mentioned ranges, molecular chains of the conjugated diene-based polymer (A) can sufficiently spread out in the liquid medium (B). Consequently, the dispersibility of an electrode active material and a solid electrolyte becomes satisfactory, and hence the dispersion stability of a slurry and the adhesiveness of an electrode can be improved to provide a satisfactory electrode. The SP value of the liquid medium (B) may be determined by, for example, a method described in "Polymer Handbook", 4th Ed., pp. VII-675 to VII-711.

<Solubility>

In the binder composition for an all-solid-state secondary battery according to this embodiment, the conjugated diene-based polymer (A) is preferably in a state of being dissolved in the liquid medium (B). That "the conjugated diene-based polymer (A) dissolves in the liquid medium (B)" means that the solubility of the conjugated diene-based polymer (A) in the liquid medium (B) is 1 g or more with respect to 100 g of the liquid medium (B). When the conjugated diene-based polymer (A) is in a state of being dissolved in the liquid medium (B), the surface of an active material can be easily coated with the conjugated diene-based polymer (A) excellent in flexibility and adhesiveness, and hence the detachment of the active material due to its stretching and shrinking at the time of charge and discharge can be effectively reduced to facilitate the provision of an all-solid-state secondary battery showing a satisfactory charge-discharge durability characteristic. In addition, the stability of the slurry becomes satisfactory, and the applicability of the slurry to a current collector also becomes satisfactory. For the above-mentioned reasons, the conjugated diene-based polymer (A) is preferably in a state of being dissolved in the liquid medium (B).

2.2. Other Additives

The binder composition for an all-solid-state secondary battery according to this embodiment may contain additives, such as an anti-aging agent and a thickener, as required.

<Anti-Aging Agent>

Examples of the anti-aging agent include the various anti-aging agents described in the foregoing <Reaction Termination Step> section in "1.1. Method of producing Conjugated Diene-based Polymer (A)".

When the binder composition for an all-solid-state secondary battery according to this embodiment contains the anti-aging agent, the content ratio of the anti-aging agent is preferably from 0.05 part by mass to 2 parts by mass, more preferably from 0.1 part by mass to 1 part by mass, particularly preferably from 0.2 part by mass to 0.8 part by mass with respect to 100 parts by mass of the total solid content of the binder composition for an all-solid-state secondary battery.

<Thickener>

When the binder composition contains the thickener, the applicability of the slurry and the charge-discharge characteristic of the all-solid-state secondary battery to be obtained can be further improved in some cases.

Examples of the thickener include: cellulose-based polymers, such as carboxymethyl cellulose, methyl cellulose, ethyl cellulose, and hydroxypropyl cellulose; poly(meth) acrylic acid; an ammonium salt or alkali metal salt of the cellulose compound or the poly(meth)acrylic acid; modified polyvinyl alcohol and polyethylene oxide; and polyvinylpyrrolidone, polycarboxylic acid, starch oxide, starch phosphate, casein, various modified starches, chitin, and a chitosan derivative. Of those, a cellulose-based polymer is preferred.

When the binder composition for an all-solid-state secondary battery according to this embodiment contains the thickener, the content ratio of the thickener is preferably 5 parts by mass or less, more preferably from 0.1 part by mass to 3 parts by mass with respect to 100 parts by mass of the total solid content of the binder composition for an all-solid-state secondary battery.

2.3. Method of Preparing Binder Composition for all-Solid-State Secondary Battery The binder composition for an all-solid-state secondary battery according to this embodiment may be prepared through a step including adding the liquid medium (B) to the conjugated diene-based polymer (A), further adding other additives as required, and appropriately performing stirring to dissolve or disperse the conjugated diene-based polymer (A) in the liquid medium (B).

The binder composition for an all-solid-state secondary battery according to this embodiment can form a binder having high adhesiveness not only to the current collector of an electrode, but also to a solid electrolyte material, and hence can have its use amount reduced to improve the conductivity of a solid electrolyte layer, thus being suitably usable for an all-solid-state type battery.

The method of preparing the binder composition for an all-solid-state secondary battery according to this embodiment may include a step of removing a particulate metal component in the binder composition (hereinafter sometimes referred to as "particulate metal removal step"). In the particulate metal removal step, the "particulate metal component" refers to a metal component present in a particulate form in the binder composition, and does not include a metal component dissolved and present in a metal ion state.

In the particulate metal removal step, a method for the removal of the particulate metal component from the binder composition for an all-solid-state secondary battery is not particularly limited, and examples thereof include: a method for removal based on filtration using a filter; a method for removal based on a vibration sieve; a method for removal based on centrifugation; and a method for removal based on a magnetic force. Of those, a method for removal based on a magnetic force is preferred because the object to be removed is the metal component.

The method for removal based on a magnetic force is not particularly limited as long as the method can remove the metal component. However, in consideration of productivity and removal efficiency, a method for removal involving arranging a magnetic filter in the production line of the binder composition for an all-solid-state secondary battery and passing the polymer solution therethrough is preferred.

The step of removing the particulate metal component from the polymer solution through a magnetic filter is preferably performed by passage through a magnetic filter forming a magnetic field having a magnetic flux density of 100 gauss or more. When the magnetic flux density is low, the removal efficiency of the metal component is reduced. For this reason, the magnetic flux density is preferably 1,000 gauss or more, and in consideration of the removal of stainless steel having weak magnetism, is more preferably 2,000 gauss or more, most preferably 5,000 gauss or more.

When the magnetic filter is arranged in the production line, it is preferred that a step of removing coarse foreign matter or metal particles through a filter such as a cartridge filter be included on the upstream side of the magnetic filter. This is because the coarse metal particles may pass through the magnetic filter depending on a flow rate at which the filtration is performed.

In addition, the magnetic filter has an effect even when the filtration is performed only once, but is more preferably of a circulation type. This is because, when the circulation type is adopted, the removal efficiency of metal particles is improved.

When the magnetic filter is arranged in the production line of the binder composition for an all-solid-state secondary battery, the site at which the magnetic filter is arranged is not particularly limited, but the magnetic filter is preferably arranged immediately before the binder composition for an all-solid-state secondary battery is filled into a container, or when a filtration step with a filtration filter is present before the filling into a container, is preferably arranged before the filtration filter. This is to prevent the mixing of the metal component into a product in the case where the metal component is desorbed from the magnetic filter.

Specific examples of the particulate metal component include metals, such as Fe, Ni, and Cr, or metal compounds thereof. The above-mentioned particulate metal component sometimes remains in the binder composition for an all-solid-state secondary battery according to this embodiment, and the particulate metal component is preferably removed through the particulate metal removal step so that the content of a particulate metal component having a particle diameter of 20 μm or more may become 10 ppm or less. The content of the particulate metal component having a particle diameter of 20 μm or more may be measured as follows: the resultant binder composition for an all-solid-state secondary battery is further filtered through a mesh having an aperture corresponding to 20 μm; the element of metal particles remaining on the mesh is subjected to elemental analysis using an X-ray microanalyzer (EPMA); the metal particles are dissolved with an acid capable of dissolving the metal; and the resultant is subjected to measurement using Inductively Coupled Plasma (ICP).

3. Slurry for all-Solid-State Secondary Battery

A slurry for an all-solid-state secondary battery according to one embodiment of the present invention contains: the above-mentioned binder composition for an all-solid-state secondary battery; and a solid electrolyte. The slurry for an all-solid-state secondary battery according to this embodiment may be used as a material for forming any one active material layer out of a positive electrode active material layer and a negative electrode active material layer, and may also be used as a material for forming a solid electrolyte layer.

The slurry for an all-solid-state secondary battery, for forming a positive electrode active material layer, contains the above-mentioned binder composition for an all-solid-state secondary battery, a solid electrolyte, and an active material for a positive electrode (hereinafter sometimes referred to simply as "positive electrode active material"). In addition, the slurry for an all-solid-state secondary battery, for forming a negative electrode active material layer, contains the above-mentioned binder composition for an all-solid-state secondary battery, a solid electrolyte, and an active material for a negative electrode (hereinafter sometimes referred to simply as "negative electrode active material"). Further, the slurry for an all-solid-state secondary battery, for forming a solid electrolyte layer, contains the above-mentioned binder composition for an all-solid-state secondary battery, and a solid electrolyte. The components that may be contained in the slurry for an all-solid-state secondary battery according to this embodiment are described below.

3.1. Active Materials

<Positive Electrode Active Material>

As the positive electrode active material, there may be used, for example: inorganic compounds, such as $MnO_2$, $MoO_3$, $V_2O_5$, $V_6O_{13}$, $Fe_2O_3$, $Fe_3O_4$, $Li_{(1-x)}CoO_2$, $Li_{(1-x)}NiO_2$, $Li_xCo_ySn_zO_2$, $Li_{(1-x)}Co_{(1-y)}Ni_yO_2$, $Li_{(1+x)}Ni_{1/3}Co_{1/3}Mn_{1/3}O_2$, $TiS_2$, $TiS_3$, $MoS_3$, $FeS_2$, $CuF_2$, and $NiF_2$; carbon materials, such as a fluorocarbon, graphite, a vapor-grown carbon fiber and/or a pulverized product thereof, a PAN-based carbon fiber and/or a pulverized product thereof, and a pitch-based carbon fiber and/or a pulverized product thereof, and conductive polymers, such as polyacetylene and poly-p-phenylene. Those positive electrode active materials may be used alone or in combination thereof.

The average particle diameter of the positive electrode active material is not particularly limited, but is preferably from 0.1 μm to 50 μm because a contact area at a solid-solid interface can be increased. In order to allow the positive electrode active material to have a predetermined average particle diameter, it is appropriate to use a pulverizer, such as a mortar, a ball mill, a sand mill, a vibrating ball mill, a satellite ball mill, or a swirling airflow type jet mill, or a classifier, such as a sieve or an air classifier. At the time of pulverization, wet type pulverization in which a solvent, such as water or methanol, is caused to coexist may be performed as required. Both a dry type and a wet type may be used for classification. In addition, a positive electrode active material obtained by a firing method may be used after being washed with water, an acidic aqueous solution, an alkaline aqueous solution, or an organic solvent.

The average particle diameter of the active material refers to a volume average particle diameter measured using a particle size distribution-measuring apparatus employing a laser diffraction method as its measurement principle. Examples of such laser diffraction particle size distribution-measuring apparatus include the HORIBA LA-300 series and the HORIBA LA-920 series (which are manufactured by Horiba, Ltd.).

In the slurry for an all-solid-state secondary battery, for forming a positive electrode active material layer, the content ratio of the positive electrode active material is preferably from 20 parts by mass to 90 parts by mass, more preferably from 40 parts by mass to 80 parts by mass with respect to 100 parts by mass of the total of solid components.

<Negative Electrode Active Material>

The negative electrode active material is not particularly limited as long as the negative electrode active material can reversibly store and release lithium ions or the like, but examples thereof include a carbonaceous material, a metal oxide, such as tin oxide or silicon oxide, elemental lithium, a lithium alloy such as a lithium-aluminum alloy, and a metal capable of forming an alloy with lithium, such as Sn, Si, or In. Of those, a carbonaceous material is preferably used from the viewpoint of reliability, and a silicon-containing material is preferably used from the viewpoint that a battery capacity can be increased.

The carbonaceous material is not particularly limited as long as the material is substantially formed of carbon, but examples thereof include petroleum pitch, natural graphite, artificial graphite such as vapor-grown graphite, and carbonaceous materials obtained by firing various synthetic resins, such as a PAN-based resin and a furfuryl alcohol resin. The examples further include various carbon fibers, such as a PAN-based carbon fiber, a cellulose-based carbon fiber, a pitch-based carbon fiber, a vapor-grown carbon fiber, a dehydrated PVA-based carbon fiber, a lignin carbon fiber, a glassy carbon fiber, and an activated carbon fiber, mesophase microspheres, graphite whiskers, and flat plate-shaped graphite.

The silicon-containing material can store more lithium ions than graphite or acetylene black to be generally used. That is, the silicon-containing material provides an increased lithium ion storage capacity per unit weight, and hence can increase the battery capacity. As a result, the silicon-containing material has an advantage of being capable of lengthening a battery driving time, and hence is expected to be used for, for example, an on-vehicle battery in the future. Meanwhile, the silicon-containing material is known to undergo a large volume change along with the storage and release of lithium ions. Whereas graphite and acetylene black each undergo a volume expansion of from about 1.2 times to about 1.5 times through the storage of lithium ions, a negative electrode active material containing silicon may undergo a volume expansion as high as about 3 times. When such expansion and contraction (charge and discharge) are repeated, a lack of durability of the negative electrode active material layer occurs, with the result that, for example, a lack of contact is liable to occur or a cycle life (battery life) is shortened in some cases. The negative electrode active material layer formed using the slurry for an all-solid-state secondary battery according to this embodiment exhibits high durability (strength) by virtue of the binder component following even the repetition of such expansion and contraction, and hence exhibits an excellent effect of being capable of achieving a satisfactory cycle life characteristic.

The average particle diameter of the negative electrode active material is not particularly limited, but is preferably from 0.1 μm to 60 μm because a contact area at a solid-solid interface can be increased. In order to allow the negative electrode active material to have a predetermined average particle diameter, the pulverizer or classifier exemplified above may be used.

In the slurry for an all-solid-state secondary battery, for forming a negative electrode active material layer, the content ratio of the negative electrode active material is preferably from 20 parts by mass to 90 parts by mass, more preferably from 40 parts by mass to 80 parts by mass with respect to 100 parts by mass of the total of the solid components.

3.2. Solid Electrolyte

The slurry for an all-solid-state secondary battery according to this embodiment contains a solid electrolyte. A solid electrolyte to be generally used for an all-solid-state secondary battery may be appropriately selected and used as the solid electrolyte, but the solid electrolyte is preferably a sulfide-based solid electrolyte or an oxide-based solid electrolyte.

The lower limit of the average particle diameter of the solid electrolyte is preferably 0.01 μm, more preferably 0.1 μm. The upper limit of the average particle diameter of the solid electrolyte is preferably 100 μm, more preferably 50 μm.

In the slurry for an all-solid-state secondary battery according to this embodiment, the lower limit of the content ratio of the solid electrolyte is preferably 50 parts by mass, more preferably 70 parts by mass, particularly preferably 90 parts by mass with respect to 100 parts by mass of the total of the solid components because battery performance and a reducing/maintaining effect on interfacial resistance can both be achieved. The upper limit of the content ratio of the solid electrolyte is preferably 99.9 parts by mass, more preferably 99.5 parts by mass, particularly preferably 99.0 parts by mass with respect to 100 parts by mass of the total of the solid components because of a similar effect. However, when the solid electrolyte is used together with the positive electrode active material or the negative electrode active material, their total preferably falls within the above-mentioned concentration ranges.

<Sulfide-Based Solid Electrolyte>

It is preferred that the sulfide-based solid electrolyte contain a sulfur atom (S) and a metal element of Group 1 or Group 2 of the periodic table, have ion conductivity, and have an electron insulating property. An example of such sulfide-based solid electrolyte is a sulfide-based solid electrolyte having a compositional formula represented by the following general formula (7).

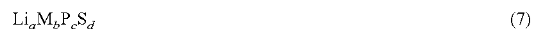

$$Li_aM_bP_cS_d \quad (7)$$

In the formula (7), M represents an element selected from B, Zn, Si, Cu, Ga, and Ge. “a” to “d” represent the composition ratios of the respective elements, and satisfy a:b:c:d=1 to 12:0 to 1:1:2 to 9.

In the general formula (7), the composition ratios of Li, M, P, and S satisfy preferably b=0, more preferably b=0 and a:c:d=1 to 9:1:3 to 7, still more preferably b=0 and a:c:d=1.5 to 4:1:3.25 to 4.5. As described later, the composition ratio of each element may be controlled by adjusting the blending amount of a raw material compound in the production of the sulfide-based solid electrolyte.

The sulfide-based solid electrolyte may be amorphous (glass), may be a crystal (glass ceramics), or may be only partially crystallized.

A ratio between $Li_2S$ and $P_2S_5$ in each of Li—P—S-based glass and Li—P—S-based glass ceramics is preferably from 65:35 to 85:15, more preferably from 68:32 to 80:20 in terms of molar ratio of $Li_2S$:$P_2S_5$. When the ratio between $Li_2S$ and $P_2S_5$ is set to fall within the ranges, lithium ion conductivity can be increased. The lithium ion conductivity of the sulfide-based solid electrolyte is preferably $1\times10^{-4}$ S/cm or more, more preferably $1\times10^{-3}$ S/cm or more.

An example of such compound is one obtained using a raw material composition containing $Li_2S$ and a sulfide of an element of any one of Group 13 to Group 15. Specific examples thereof include $Li_2S—P_2S_5$, $Li_2S—GeS_2$, $Li_2S—GeS_2—ZnS$, $Li_2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2S—SiS_2$, $Li_2S—Al_2S_3$, $Li_2S—SiS_2—Al_2S_3$, $Li_2S—SiS_2—P_2S_5$, $Li_2S—SiS_2—Li1$, $Li_2S—SiS_2—Li_4SiO_4$, $Li_2S—SiS_2—Li_3PO_4$, and $LiioGeP_2Si_2$. Of those, a crystalline and/or amorphous raw material composition formed of $Li_2S—P_2S_5$, $Li_2S—GeS_2—Ga_2S_3$, $Li_2S—GeS_2—P_2S_5$, $Li_2S—SiS_2—P_2S_5$, $Li_2S—SiS_2—Li_4SiO_4$, or $Li_2S—SiS_2—Li_3PO_4$ is preferred because the composition has high lithium ion conductivity.

As a method of synthesizing the sulfide-based solid electrolyte through use of such raw material composition, there is given, for example, an amorphization method. Examples of the amorphization method include a mechanical milling method and a melt quenching method. Of those, a mechanical milling method is preferred because the method enables treatment at ordinary temperature, thereby being able to simplify a production process.

The sulfide-based solid electrolyte may be synthesized with reference to the literatures, such as T. Ohtomo, A. Hayashi, M. Tatsumisago, Y. Tsuchida, S. Hama, K. Kawamoto, Journal of Power Sources, 233, (2013), pp 231-235, and A. Hayashi, S. Hama, H. Morimoto, M. Tatsumisago, T. Minami, Chem. Lett., (2001), pp 872-873.

<Oxide-Based Solid Electrolyte>

It is preferred that the oxide-based solid electrolyte contain an oxygen atom (0) and a metal element of Group 1 or Group 2 of the periodic table, have ion conductivity, and have an electron insulating property. Examples of such oxide-based solid electrolyte include $Li_{xa}La_{ya}TiO_3$ [xa=0.3 to 0.7, ya=0.3 to 0.7] (LLT), $Li_7La_3Zr_2O_{12}$ (LLZ), $Li_{3.5}Zn_{0.25}GeO_4$ having a lithium super ionic conductor (LISICON)-type crystal structure, $LiTi_2P_3O_{12}$ having a natrium super ionic conductor (NASICON)-type crystal structure, $Li_{(1+xb+yb)}(Al,Ga)_{xb}(Ti,Ge)_{(2-xb)}Si_{yb}P_{(3-yb)}O_{12}$ (where $0 \le xb \le 1$ and $0 \le yb \le 1$), and $Li_7La_3Zr_2O_{12}$ having a garnet-type crystal structure.

In addition, a phosphorus compound containing Li, P, and O is also preferred as the oxide-based solid electrolyte. Examples thereof include lithium phosphate ($Li_3PO_4$), LiPON obtained by substituting part of the oxygen atoms of lithium phosphate with a nitrogen atom, and LiPOD (D represents at least one kind selected from Ti, V, Cr, Mn, Fe, Co, Ni, Cu, Zr, Nb, Mo, Ru, Ag, Ta, W, Pt, and Au). In addition, for example, LiAON (A represents at least one kind selected from Si, B, Ge, Al, C, and Ga) may also be preferably used.

Of those, $Li_{(1+xb+yb)}(A,Ga)_{xb}(Ti,Ge)_{(2-xb)}Si_{yb}P_{(3-yb)}O_{12}$ (where $0 \le xb \le 1$ and $0 \le yb \le 1$) is preferred because of having high lithium ion conductivity and being chemically stable and easy to handle. Those oxide-based solid electrolytes may be used alone or in combination thereof.

The lithium ion conductivity of the oxide-based solid electrolyte is preferably $1 \times 10^{-6}$ S/cm or more, more preferably $1 \times 10^{-5}$ S/cm or more, particularly preferably $5 \times 10^{-5}$ S/cm or more.

3.3. Other Additives

The slurry for an all-solid-state secondary battery according to this embodiment may contain, besides the above-mentioned components, other additives as required. Examples of the other additives include a conductivity-imparting agent, a thickener, and a liquid medium (excluding the liquid medium included in the binder composition for an all-solid-state secondary battery).

<Conductivity-Imparting Agent>

The conductivity-imparting agent has an assisting effect on the conductivity of electrons, and hence is added to the slurry for an all-solid-state secondary battery for forming a positive electrode active material layer or a negative electrode active material layer. Specific examples of the conductivity-imparting agent include carbons, such as activated carbon, acetylene black, ketjen black, furnace black, graphite, a carbon fiber, and a fullerene. Of those, acetylene black or furnace black is preferred. When the slurry for an all-solid-state secondary battery according to this embodiment contains the conductivity-imparting agent, the content ratio of the conductivity-imparting agent is preferably 20 parts by mass or less, more preferably from 1 part by mass to 15 parts by mass, particularly preferably from 2 parts by mass to 10 parts by mass with respect to 100 parts by mass of the active material.

<Thickener>

Specific examples of the thickener include the thickeners given as examples in the foregoing <Thickener> section in "2.2. Other Additives". When the slurry for an all-solid-state secondary battery according to this embodiment contains the thickener, the content ratio of the thickener is preferably 5 parts by mass or less, more preferably from 0.1 part by mass to 3 parts by mass with respect to 100 parts by mass of the total solid content of the slurry for an all-solid-state secondary battery.

<Liquid Medium>

Specific examples of the liquid medium include the liquid media given as examples in the foregoing "2.1. Liquid Medium (B)" section. When the liquid medium is added to the slurry for an all-solid-state secondary battery according to this embodiment, the same liquid medium as the liquid medium (B) contained in the binder composition for an all-solid-state secondary battery may be added, or a different liquid medium may be added, but the same liquid medium is preferably added. The content ratio of the liquid medium in the slurry for an all-solid-state secondary battery according to this embodiment may be adjusted to any ratio in order to make its applicability satisfactory to suppress the concentration gradients of the conjugated diene-based polymer (A) and the active material in drying treatment after application.

3.4. Method of Preparing Slurry for all-Solid-State Secondary Battery

The slurry for an all-solid-state secondary battery according to this embodiment may be produced by any method as long as the slurry contains the above-mentioned binder composition for an all-solid-state secondary battery and the solid electrolyte.

However, in order to more efficiently and inexpensively produce a slurry having more satisfactory dispersibility and stability, the slurry is preferably produced by adding the solid electrolyte and the optionally added components to be used as required to the above-mentioned binder composition for an all-solid-state secondary battery, followed by their mixing. The mixing of the binder composition for an all-solid-state secondary battery and the other components may be performed through stirring by a known technique.

With regard to mixing/stirring means for producing the slurry for an all-solid-state secondary battery, there is a need to select: a mixing machine capable of performing stirring to such a degree that aggregates of solid electrolyte particles do not remain in the slurry; and necessary and sufficient dispersion conditions. The degree of dispersion may be measured with a grind gauge, and the mixing/dispersion is preferably performed so that no aggregate product larger than at least 100 μm remains. Examples of the mixing machine that meets such condition may include a ball mill, a bead mill, a sand mill, a defoaming machine, a pigment disperser, a mortar machine, an ultrasonic disperser, a homogenizer, a planetary mixer, and a Hobart mixer.

At least part of the process of the preparation of the slurry for an all-solid-state secondary battery (mixing operation for its components) is preferably performed under reduced pressure. With this configuration, air bubbles can be prevented from occurring in the positive electrode active material layer, negative electrode active material layer, or solid electrolyte layer to be obtained. The degree of pressure reduction is preferably set to from about $5.0 \times 10^3$ Pa to about $5.0 \times 10^5$ Pa in terms of absolute pressure.

4. Solid Electrolyte Sheet

A solid electrolyte sheet according to one embodiment of the present invention includes a substrate and a layer formed thereon by applying and drying the above-mentioned slurry for an all-solid-state secondary battery.

The solid electrolyte sheet according to this embodiment may be produced by, for example, applying the above-mentioned slurry for an all-solid-state secondary battery onto a film serving as a base material by a blade method (e.g., a doctor blade method), a calender method, a spin coating method, a dip coating method, an ink jet method, an offset method, a die coating method, a spray method, or the like, drying the slurry to form a layer, and then peeling the film. As such film, there may be used, for example, a general one such as a PET film subjected to release treatment.

Alternatively, the solid electrolyte sheet may be formed by directly applying the slurry for an all-solid-state secondary battery containing the solid electrolyte to the surface of a green sheet on which the solid electrolyte sheet is laminated, or of another constituent member of an all-solid-state secondary battery, and drying the slurry.

For the solid electrolyte sheet according to this embodiment, the above-mentioned slurry for an all-solid-state secondary battery is preferably applied so that the thickness of the layer may fall within the range of preferably from 1 μm to 500 μm, more preferably from 1 μm to 100 μm. When the thickness of the layer falls within the above-mentioned ranges, conduction ions such as lithium ions can easily move, and hence the output of the battery is increased. In addition, when the thickness of the layer falls within the above-mentioned ranges, the battery as a whole can be thinned, and hence its capacity per unit volume can be increased.

The drying of the slurry for an all-solid-state secondary battery is not particularly limited, and any means, such as drying by heating, drying under reduced pressure, or drying by heating under reduced pressure, may be used. A drying atmosphere is not particularly limited, and the drying may be performed, for example, under an air atmosphere.

In the solid electrolyte sheet according to this embodiment, the polymer distribution coefficient of its solid electrolyte layer is preferably from 0.60 to 1.00, more preferably from 0.70 to 0.95, still more preferably from 0.75 to 0.90. The "polymer distribution coefficient" in this embodiment refers to a coefficient defined by the following measurement method.

That is to say, (1) The solid electrolyte layer is formed on one surface of a substrate by the above-mentioned method. The resultant is divided into two to produce two solid electrolyte sheets having the same solid electrolyte layer.

(2) A double-sided tape (manufactured by Nichiban Co., Ltd., product number: "NW-25") is bonded onto an aluminum plate prepared in advance, and a Kapton tape (manufactured by Teraoka Corporation, product number: "650S") is further bonded onto the double-sided tape so that its pressure-sensitive adhesive surface faces upward.

(3) One solid electrolyte layer side of the solid electrolyte sheet produced in (1) is bonded onto the pressure-sensitive adhesive surface of the Kapton tape prepared in (2), and is pressure-bonded thereonto with a roller.

(4) The aluminum plate produced in (3) is fixed to a horizontal surface with the substrate directed upward, and then the substrate is peeled from the bonding surface between the substrate and the solid electrolyte layer by pulling the substrate upward at a constant speed so as to have an angle of 900 with the aluminum plate.

(5) Both sides of the peeling interface, that is, the solid electrolyte layer up to a depth of 1.5 μm from the surface of the solid electrolyte layer remaining on the substrate (when only a thickness of 1.5 μm or less remains, the entirety of the remainder) and the solid electrolyte layer up to a depth of 1.5 μm from the surface of the solid electrolyte layer remaining on the pressure-sensitive adhesive tape are scraped off, and are used as a "measurement sample A".

(6) The entirety of the solid electrolyte layer is scraped off of the other solid electrolyte sheet produced in (1), and is used as a "measurement sample B".

(7) Each of the measurement sample A and the measurement sample B is analyzed using a pyrolysis-gas chromatograph including a high-frequency induction heating-type pyrolyzer to calculate the content (mass %) of a polymer component per unit weight of each sample. The resultant values are substituted into the following equation to calculate the polymer distribution coefficient.

Polymer distribution coefficient=(polymer content of measurement sample *A*: mass %)/(polymer content of measurement sample *B*: mass %)

According to the equation, when the polymer distribution coefficient is 1, it is indicated that the polymer component in the solid electrolyte layer is uniformly distributed. In addition, the polymer distribution coefficient may be interpreted as follows: when its value is more than 1, the polymer component is localized in the vicinity of the peeling interface between the substrate and the solid electrolyte layer; and when the value is less than 1, the polymer component in the vicinity of the peeling interface between the substrate and the solid electrolyte layer is sparse.

Accordingly, when the polymer distribution coefficient of the solid electrolyte layer is from 0.60 to 1.00, the polymer component is sufficiently present in the vicinity of the interface between the substrate and the solid electrolyte layer. Consequently, a solid electrolyte sheet for an all-solid-state secondary battery that has satisfactory binding properties between the substrate and the solid electrolyte layer, and besides, is excellent in electric characteristics is obtained. When the polymer distribution coefficient of the solid electrolyte layer is below the above-mentioned range, the amount of the polymer component functioning as a binder is reduced at the interface between the substrate and the solid electrolyte layer, and hence adhesiveness between the substrate and the solid electrolyte layer tends to be reduced. In addition, the occurrence of such bleeding (migration) tends to impair the smoothness of the surface of the solid electrolyte layer. Meanwhile, when the polymer distribution coefficient is beyond the above-mentioned range, a binder component that is an insulator is localized at the interface between the substrate and the solid electrolyte layer, and thus the internal resistance of the solid electrolyte sheet tends to be increased to impair the electric characteristics.

When the solid electrolyte sheet contains a positive electrode active material and a solid electrolyte, the solid electrolyte sheet has a function as a positive electrode active material layer. When the solid electrolyte sheet contains a negative electrode active material and a solid electrolyte, the solid electrolyte sheet has a function as a negative electrode active material layer. In addition, when the solid electrolyte sheet contains no positive electrode active material and no negative electrode active material, and contains a solid electrolyte, the solid electrolyte sheet has a function as a solid electrolyte layer.

5. Electrode for all-Solid-State Secondary Battery and all-Solid-State Secondary Battery An electrode for an all-solid-state secondary battery according to one embodiment of the present invention includes: a current collector; and an active material layer formed on a surface of the current collector by applying and drying the above-mentioned slurry for an all-solid-state secondary battery. Such electrode for an all-solid-state secondary battery may be produced by applying the above-mentioned slurry for an all-solid-state secondary battery to the surface of the current collector such as metal foil to form a coating film, and then drying the coating film to form the active material layer. The thus produced electrode for an all-solid-state secondary battery is such that the active material layer containing the above-mentioned conjugated diene-based polymer (A), a solid electrolyte, and an active material, and further, optional components added as required is bound onto the current collector, and hence the electrode for an all-solid-state secondary battery is excellent in flexibility, abrasion resistance, and powder fall-off resistance, and shows a satisfactory charge-discharge durability characteristic.

An electron conductor that does not cause a chemical change is preferably used as the current collector of a positive electrode or a negative electrode. As the current collector of a positive electrode, aluminum, stainless steel, nickel, titanium, alloys thereof, and the like, and a product obtained by subjecting a surface of aluminum or stainless steel to treatment with carbon, nickel, titanium, or silver are preferred. Of those, aluminum and an aluminum alloy are more preferred. As the current collector of a negative electrode, aluminum, copper, stainless steel, nickel, titanium, and alloys thereof are preferred. Of those, aluminum, copper, and a copper alloy are more preferred.

With regard to the shape of the current collector, a current collector having a film sheet shape is generally used, but for example, a net, a punched product, a lath body, a porous body, a foam body, or a molded body of a fiber group may also be used. The thickness of the current collector is not particularly limited, but is preferably from 1 μm to 500 μm. In addition, it is also preferred that unevenness be formed on the surface of the current collector through surface treatment.

A doctor blade method, a reverse roll method, a comma bar method, a gravure method, an air knife method, or the like may be utilized as means for applying the slurry for an all-solid-state secondary battery onto the current collector. As conditions for the drying treatment of the applied film of the slurry for an all-solid-state secondary battery, a treatment temperature is preferably from 20° C. to 250° C., more preferably from 50° C. to 150° C., and a treatment time is preferably from 1 minute to 120 minutes, more preferably from 5 minutes to 60 minutes.

In addition, the active material layer formed on the current collector may be subjected to press processing and compressed. A high-pressure super press, a soft calender, a 1-ton press machine, or the like may be utilized as means for performing the press processing. Conditions for the press processing may be appropriately set in accordance with the processing machine to be used.

The active material layer formed on the current collector as described above has, for example, a thickness of from 40 μm to 100 μm and a density of from 1.3 g/cm$^3$ to 2.0 g/cm$^3$.

The thus produced electrode for an all-solid-state secondary battery is suitably used as an electrode in an all-solid-state secondary battery having a configuration in which a solid electrolyte layer is sandwiched between a pair of electrodes, specifically as a positive electrode and/or negative electrode for an all-solid-state secondary battery. In addition, a solid electrolyte layer formed using the above-mentioned slurry for an all-solid-state secondary battery is suitably used as a solid electrolyte layer for an all-solid-state secondary battery.

An all-solid-state secondary battery according to this embodiment may be produced using a known method. Specifically, such a production method as described below may be used.

First, a slurry for an all-solid-state secondary battery positive electrode containing a solid electrolyte and a positive electrode active material is applied onto a current collector and dried to form a positive electrode active material layer, to thereby produce a positive electrode for an all-solid-state secondary battery. Then, a slurry for an all-solid-state secondary battery solid electrolyte containing a solid electrolyte is applied to the surface of the positive electrode active material layer of the positive electrode for an all-solid-state secondary battery and dried to form a solid electrolyte layer. Further, similarly, a slurry for an all-solid-state secondary battery negative electrode containing a solid electrolyte and a negative electrode active material is applied to the surface of the solid electrolyte layer and dried to form a negative electrode active material layer. Finally, a negative electrode-side current collector (metal foil) is mounted on the surface of the negative electrode active material layer. Thus, a desired structure of an all-solid-state secondary battery may be obtained.

Alternatively, a solid electrolyte sheet is produced on a release PET film, and the resultant is bonded onto a positive electrode for an all-solid-state secondary battery or negative electrode for an all-solid-state secondary battery produced in advance. After that, the release PET is peeled off. Thus, a desired structure of an all-solid-state secondary battery may be obtained. It is appropriate that a method for the application of each of the above-mentioned compositions be in accordance with a conventional method. At this time, after the application of each of the slurry for an all-solid-state secondary battery positive electrode, the slurry for an all-solid-state secondary battery solid electrolyte layer, and the slurry for an all-solid-state secondary battery negative electrode, each slurry is preferably subjected to heating treatment. A heating temperature is preferably equal to or higher than the glass transition temperature of the conjugated diene-based polymer (A). Specifically, the heating temperature is preferably 30° C. or more, more preferably 60° C. or more, most preferably 100° C. or more. The upper limit thereof is preferably 300° C. or less, more preferably 250° C. or less. When heating is performed within such temperature ranges, while the conjugated diene-based polymer (A) is softened, its shape can be maintained. Thus, satisfactory adhesiveness and lithium ion conductivity can be obtained in the all-solid-state secondary battery.

In addition, it is also preferred to perform pressurization while performing the heating. A pressurization pressure is preferably 5 kN/cm$^2$ or more, more preferably 10 kN/cm$^2$ or more, particularly preferably 20 kN/cm$^2$ or more. As used herein, the term "discharge capacity" refers to a value per weight of the active material of an electrode, and in a half cell, refers to a value per weight of the active material of its negative electrode.

6. Examples

The present invention is specifically described below by way of Examples, but the present invention is not limited to these Examples. "Part(s)" and "%" in Examples and Comparative Examples are by mass unless otherwise stated.

6.1. Measurement Methods for Various Physical Property Values

In the following Examples and Comparative Examples, measurement methods for various physical property values are as described below.

(1) Measurement of 1,2-Vinyl Bond Content

A 1,2-vinyl bond content (unit: mol %) in a polymer was determined by 500 MHz $^1$H-NMR using deuterated chloroform as a solvent.

(2) Bound Styrene Content

A bound styrene content (unit: %) in a polymer was determined by 500 MHz $^1$H-NMR using deuterated chloroform as a solvent.

(3) Weight Average Molecular Weight (Mw)

A weight average molecular weight was determined in terms of polystyrene from a retention time corresponding to the apex of the maximum peak of a GPC curve obtained using gel permeation chromatography (GPC) (product name: "HLC-8120GPC", manufactured by Tosoh Corporation).

(Conditions of GPC)

Column: product name: "GMHXL" (manufactured by Tosoh Corporation) 2 columns

Column temperature: 40° C.

Mobile phase: tetrahydrofuran

Flow rate: 1.0 ml/min

Sample concentration: 10 mg/20 ml (4) Hydrogenation Ratio (%) and [α]

The hydrogenation ratio (%) and [α] of a polymer were determined by 500 MHz $^1$H-NMR using deuterated chloroform as a solvent. [α] is a value represented by the above-mentioned equation (i).

(5) SP Value (MPa$^{1/2}$)

For the SP value (MPa$^{1/2}$) of a polymer, $\delta_{mix}$ was determined by the following equation from the $\varphi_i$ and $\delta_i$ of each monomer unit, where a structural unit based on each monomer for forming the polymer was designated as a monomer unit "i", $\varphi_i$ represented the volume fraction of the monomer unit "i", and $\delta_i$ represented the SP value of a homopolymer of the monomer unit "i", and the $\delta_{mix}$ was adopted as the SP value (MPa$_{1/2}$) of the polymer.

$$\delta_{mix}=\Sigma(\varphi_i \times \delta_i)$$

6.2. Synthesis Examples of Conjugated Diene-Based Polymers

<Synthesis of Hydrogenation Catalyst E>

A hydrogenation catalyst E to be used in Synthesis Example A-11, Synthesis Example A-12, and Synthesis Example A-15 described below was synthesized as described below.

A three-necked flask having a volume of 1 L with a stirrer and a dropping funnel was purged with dry nitrogen, and 200 ml of anhydrous tetrahydrofuran and 0.2 mol of tetrahydrofurfuryl alcohol were added. After that, a n-butyllithium/cyclohexane solution (0.2 mol) was dropped into the three-necked flask at 15° C. to effect a reaction, to thereby provide a tetrahydrofuran solution of tetrahydrofurfuryloxylithium.

Next, a three-necked flask having a volume of 1 L with a stirrer and a dropping funnel was purged with dry nitrogen, and 49.8 g (0.2 mol) of bis(η5-cyclopentadienyl)titanium dichloride and 250 ml of anhydrous tetrahydrofuran were added. Then, the tetrahydrofuran solution of tetrahydrofurfuryloxylithium obtained by the method described above was added dropwise at room temperature under stirring in about 1 hour. About 2 hours later, a reddish brown liquid was filtered, and the insoluble part was washed with dichloromethane.

After that, the filtrate and the washing liquid were combined, and the solvent was removed under reduced pressure. Thus, the hydrogenation catalyst E [bis(η5-cyclopentadienyl)titanium (tetrahydrofurfuryloxy)chloride] (sometimes referred to as "[chlorobis(2,4-cyclopentadienyl)titanium(IV) tetrahydrofurfurylalkoxide]") was obtained. The yield was 95%.

Synthesis Example A-1

(Step 1)

A polymerization reactor made of stainless steel with a stirring device having an internal volume of 20 L was washed and dried, and the atmosphere inside the polymerization reactor was purged with dry nitrogen. Next, 10.2 kg of hexane, 855 g of 1,3-butadiene, 45 g of styrene, 9.1 mL of tetrahydrofuran, and 0.8 mL of ethylene glycol diethyl ether were fed into the polymerization reaction vessel. Next, a hexane solution of a small amount of n-butyllithium (n-BuLi) serving as a scavenger was fed into the polymerization reactor in order to detoxify in advance an impurity capable of acting to deactivate a polymerization initiator, and then a n-hexane solution containing n-BuLi at 12.5 mmol was fed to initiate polymerization. Copolymerization of 1,3-butadiene and styrene was performed for 2 hours. During the polymerization, a stirring speed was set to 130 rpm, the temperature in the polymerization reactor was set to 65° C., and 1,045 g of 1,3-butadiene and 55 g of styrene were continuously supplied into the polymerization reaction vessel. Then, while the temperature in the polymerization reactor was kept at 65° C., the resultant polymerization solution was stirred at a stirring speed of 130 rpm in the polymerization reactor.

(Step 2)

After the step 1, while the temperature in the polymerization reactor was kept at 65° C., the resultant polymer solution was stirred at a stirring speed of 130 rpm, and 12.5 mmol of [3-(diethylamino)propyl]trimethoxysilane serving as a modifier was added to the polymerization solution, followed by 15 minutes of stirring. Then, 5 mL of a hexane solution containing 0.8 mL of methanol was fed into the polymerization reactor, and the polymer solution was stirred for 5 minutes. 8.0 g of 2-tert-butyl-6-(3-tert-butyl-2-hydroxy-5-methylbenzyl)-4-methylphenyl acrylate (manufactured by Sumitomo Chemical Company, Limited, Sumilizer GM) and 4.0 g of pentaerythrityl tetrakis(3-laurylthiopropionate) (manufactured by Sumitomo Chemical Company, Limited, Sumilizer TP-D) were added into the polymerization reactor. Next, most of the volatile content in the polymer solution was evaporated at ordinary temperature for 24 hours, followed further by drying under reduced pressure at 55° C. for 12 hours to provide a polymer (A-1).

Synthesis Example A-2

(Step 1)

A polymerization reactor made of stainless steel with a stirring device having an internal volume of 20 L was washed and dried, and the atmosphere inside the polymerization reactor was purged with dry nitrogen. Next, 10.2 kg of hexane, 855 g of 1,3-butadiene, 45 g of styrene, 6.1 mL of tetrahydrofuran, and 5.5 mL of ethylene glycol diethyl ether were fed into the polymerization reaction vessel. Next, a hexane solution of a small amount of n-BuLi serving as a scavenger was fed into the polymerization reactor, and then a n-hexane solution containing n-BuLi at 16.5 mmol was fed to initiate polymerization. Copolymerization of 1,3-butadiene and styrene was performed for 2 hours. During the polymerization, a stirring speed was set to 130 rpm, the temperature in the polymerization reactor was set to 65° C., and 1,045 g of 1,3-butadiene and 55 g of styrene were continuously supplied into the polymerization reaction vessel. Then, while the temperature in the polymerization reactor was kept at 65° C., the resultant polymerization solution was stirred at a stirring speed of 130 rpm in the polymerization reactor, and 1.73 mmol of silicon tetrachloride was added to the polymerization solution, followed by 15 minutes of stirring.

(Step 2)

After the step 1, while the temperature in the polymerization reactor was kept at 65° C., the resultant polymer solution was stirred at a stirring speed of 130 rpm, and 7.66 mmol of [3-(diethylamino)propyl]trimethoxysilane serving as a modifier was added to the polymerization solution, followed by 15 minutes of stirring.

(Step 3)

After the step 2, while the temperature in the polymerization reactor was kept at 65° C., the resultant polymerization solution was stirred at a stirring speed of 130 rpm in the polymerization reactor, and a n-hexane solution containing 11.5 mmol of n-BuLi was added, followed by 15 minutes of stirring. Then, 5 mL of a hexane solution containing 1.7 mL of methanol was fed into the polymerization reactor, and the polymer solution was stirred for 5 minutes. 8.0 g of "Sumilizer GM" and 4.0 g of "Sumilizer TP-D" were added into the polymerization reactor. Next, most of the volatile content in the polymer solution was evaporated at ordinary temperature in 24 hours, followed further by drying under reduced pressure at 55° C. for 12 hours to provide a polymer (A-2).

Synthesis Example A-3 to Synthesis Example A-8, and Synthesis Example A-13

Respective polymers (A-3) to (A-8), and (A-13) were obtained by performing polymerization and solvent removal in the same manner as in Synthesis Example A-1 described above except that the kinds and use amounts of the raw materials were set as shown in Tables 1 and 2 below.

Synthesis Example A-9

(Step 1)

An autoclave reactor having an internal volume of 50 liters, which had been purged with nitrogen, was loaded with 25 kg of cyclohexane serving as a hydrocarbon solvent, 562 ml of tetrahydrofuran serving as a vinyl control agent, 1,000 g of styrene, 3,900 g of 1,3-butadiene, and 0.55 g (in terms of m-, p-divinylbenzene) of divinylbenzene (purity: 55 mass %). After the temperature of the contents of the reactor had been adjusted to 10° C., 51.5 mmol of n-butyllithium serving as a polymerization initiator was added to initiate polymerization. The polymerization was performed under a thermally insulated condition, and the highest temperature reached 85° C. At the time point when a polymerization conversion rate of 99% was achieved (after a lapse of 26 minutes from the initiation of the polymerization), 100 g of 1,3-butadiene was added, and the mixture was further polymerized for 3 minutes.

(Step 2)

After the step 1, 2.1 mmol of tin tetrachloride was added, and the mixture was subjected to a reaction for 30 minutes. Further, 43.8 mmol of N,N-bis(trimethylsilyl)aminopropylmethyldiethoxysilane was added, and the mixture was subjected to a reaction for 30 minutes to provide a polymer solution containing a modified conjugated diene-based copolymer. To the resultant polymer solution, 15 g of 2,6-di-tert-butyl-p-cresol was added, and then the solvent was removed by performing steam stripping using hot water adjusted to pH=9 with sodium hydroxide, to provide a modified conjugated diene-based copolymer. After that, the modified conjugated diene-based copolymer was dried using a heat roll controlled to a temperature of 110° C. to provide a polymer (A-9).

Synthesis Example A-10

A polymer (A-10) was obtained by performing polymerization and solvent removal in the same manner as in Synthesis Example A-9 described above except that the kinds and use amounts of the raw materials were set as shown in Table 2 below.

Synthesis Example A-11

(Step 1)

An autoclave reactor having an internal volume of 50 liters, which had been purged with nitrogen, was loaded with 25,900 g of cyclohexane, 75 g of tetrahydrofuran, 370 g of styrene, and 3,264 g of 1,3-butadiene. After the temperature of the contents of the reactor had been adjusted to 45° C., a cyclohexane solution containing n-butyllithium (39 mmol) was added to initiate polymerization. The polymerization was performed under a thermally insulated condition, and the highest temperature reached 80° C. After it had been recognized that a polymerization conversion rate of 99% had been achieved, 111 g of butadiene was added, and the mixture was further polymerized for 5 minutes to provide a reaction liquid containing a polymer.

(Step 2)

To the reaction liquid obtained in the step 1, 2 mmol of silicon tetrachloride was added, and the mixture was subjected to a reaction for 10 minutes. Further, 28 mmol of [3-(diethylamino)propyl]trimethoxysilane was added, and the mixture was subjected to a reaction for 20 minutes.

(Step 3)

The reaction liquid obtained in the step 2 was adjusted to 80° C. or more, and hydrogen was introduced into the system. After that, 3.2 g of diethylaluminum chloride, 2.4 g of the hydrogenation catalyst E, and n-butyllithium (15 mmol) were added, and the mixture was subjected to a reaction by supplying hydrogen so as to keep a hydrogen pressure of 0.7 MPa or more until a predetermined cumulative hydrogen value was reached. After that, the reaction liquid was returned to ordinary temperature and ordinary pressure, and was taken out of the reaction vessel to provide a polymer solution. To the resultant polymer solution containing a hydrogenated conjugated diene-based copolymer, 12 g of 2,6-di-tert-butyl-p-cresol was added. Then, an aqueous solution (temperature: 80° C.) adjusted to a pH of 8.5 (pH at 80° C. according to a glass electrode method) with ammonia serving as a pH adjusting agent was placed in a solvent removal tank, and further, the above-mentioned polymer solution was added (at a ratio of 1,000 parts by mass of the above-mentioned aqueous solution to 100 parts by mass of the polymer solution). The solvent was removed by performing steam stripping (steam temperature: 190° C.) at a temperature of the liquid phase of the solvent removal tank of 95° C. for 2 hours, and drying was performed with a heat roll controlled to a temperature of 110° C. to provide a polymer (A-11). The polymer (A-11) had a hydrogenation ratio of 40% ($\alpha$=0.4).

Synthesis Example A-12 and Synthesis Example A-15

Polymers (A-12) and (A-15) were obtained by performing polymerization, hydrogenation, and solvent removal in the same manner as in Synthesis Example A-11 described above except that: the hydrogen supply amount in the step 3 was changed; and the kinds and use amounts of the raw materials were set as shown in Table 2 below. The polymer (A-12) had a hydrogenation ratio of 60% ($\alpha$=0.6), and the polymer (A-15) had a hydrogenation ratio of 88% ($\alpha$=0.88).

Synthesis Example A-14

A polymer (A-14) was obtained by performing polymerization and solvent removal in the same manner as in Synthesis Example A-2 described above except that the kinds and use amounts of the raw materials were set as shown in Table 2 below.

6.3. Example 1

6.3.1. Preparation of Binder Composition

The polymer (A-1) obtained in Synthesis Example A-1 above, and 500 ppm of Sumilizer GM serving as an anti-aging agent were added into diisobutyl ketone serving as a liquid medium (B), and the mixture was stirred at 90° C. for 3 hours to dissolve the polymer (A-1) and the anti-aging agent in diisobutylketone. After that, the resultant binder composition was transferred to a three-necked flask, and while a reduced pressure of 100 Torr was maintained, bubbling with a dry nitrogen gas having a water vapor content of 25.0 mg/L or less was performed at 90° C. for 4 hours to prepare a binder composition having its residual moisture content reduced to 55 ppm. Then, the binder composition was filtered through a cartridge filter having a filter membrane having an average pore diameter of 3.00 μm (manufactured by ADVANTEC, all fluoropolymer cartridge filter, product name: "TCF-300-H5MF"), and then filled into a 1 L CLEANBARRIER (trademark) bottle (barrier container for an ultrahigh purity solvent) commercially available from Aicello Chemical Co., Ltd. The total solid content of the binder composition with respect to 100 mass % of the entirety thereof is 10.1%. This preparation work was performed in a dry room having a cleanliness class of class 7 according to ISO 14644-1, and an interior dew point of −40° C. DP or less.

6.3.2. Preparation and Evaluation of Slurry for all-Solid-State Secondary Battery <Preparation of Slurry for all-Solid-State Secondary Battery Positive Electrode>

70 Parts by mass of $LiCoO_2$ (average particle diameter: 10 μm) serving as a positive electrode active material, 30 parts by mass of sulfide glass formed of $Li_2S$ and $P_2S_5$($Li_2S/P_2S_5$=75 mol %/25 mol %, average particle diameter: 5 μm) serving as a solid electrolyte, 2 parts by mass of acetylene black serving as a conductive aid, and the binder composition prepared in the foregoing in an amount corresponding to a solid content of 2 parts by mass were mixed, and diisobutyl ketone was further added as a liquid medium (B) to adjust the solid content concentration to 75%, followed by mixing in a planetary centrifugal mixer (manufactured by Thinky Corporation, Awatori Rentaro ARV-310) for 10 minutes to prepare a slurry for an all-solid-state secondary battery positive electrode.

<Preparation of Slurry for all-Solid-State Secondary Battery Solid Electrolyte Layer>

100 Parts by mass of sulfide glass formed of $Li_2S$ and $P_2S_5$($Li_2S/P_2S_5$=75 mol %/25 mol %, average particle diameter: 5 μm) serving as a solid electrolyte and the binder composition prepared in the foregoing in an amount corresponding to a solid content of 2 parts by mass were mixed, and diisobutylketone was further added as a liquid medium (B) to adjust the solid content concentration to 55%, followed by mixing in a planetary centrifugal mixer (manufactured by Thinky Corporation, Awatori Rentaro ARV-310) for 10 minutes to prepare a slurry for an all-solid-state secondary battery solid electrolyte layer.

<Preparation of Slurry for all-Solid-State Secondary Battery Negative Electrode>

65 Parts by mass of artificial graphite (average particle diameter: 20 μm) serving as a negative electrode active material, 35 parts by mass of sulfide glass formed of $Li_2S$ and $P_2S_5$($Li_2S/P_2S_5$=75 mol %/25 mol %, average particle diameter: 5 μm) serving as a solid electrolyte, and the binder composition prepared in the foregoing in an amount corresponding to a solid content of 2 parts by mass were mixed, and diisobutyl ketone was further added as a liquid medium (B) to adjust the solid content concentration to 65%, followed by mixing in a planetary centrifugal mixer (manufactured by Thinky Corporation, Awatori Rentaro ARV-310) for 10 minutes to prepare a slurry for an all-solid-state secondary battery negative electrode.

<Evaluation of Dispersion Stability of Slurry>

The slurry for an all-solid-state secondary battery solid electrolyte layer obtained in the foregoing was measured for its viscosity at 25° C. with a B-type viscometer (manufactured by Toki Sangyo Co., Ltd.) at 50 rpm within 5 minutes after its preparation, and the viscosity was represented by $\eta_0$. The slurry for an all-solid-state secondary battery solid electrolyte layer was stored in a thermostatic chamber at 25° C. for 48 hours. The slurry after the storage was measured for its viscosity at 25° C. with a B-type viscometer (manufactured by Toki Sangyo Co., Ltd.) at 50 rpm, and the viscosity was represented by $\eta_1$. A viscosity change ratio $\Delta\eta(\%)=\eta_1/\eta_0\times100$ in this case was calculated, and evaluation was performed by the following criteria. The result is shown in Table 1 below. A slurry having a smaller viscosity change ratio $\Delta\eta$ is more excellent in dispersion stability.

(Evaluation Criteria)

AA: The $\Delta\eta$ is 80% or more and less than 120%.

A: The $\Delta\eta$ is 70% or more and less than 80% or 120% or more and less than 130%.

B: The $\Delta\eta$ is 60% or more and less than 70% or 130% or more and less than 140%.

C: The $\Delta\eta$ is less than 60% or 140% or more.

6.3.3. Production and Evaluation of all-Solid-State Secondary Battery Positive and Negative Electrodes, and Solid Electrolyte Layer <Production of all-Solid-State Secondary Battery Positive Electrode>

The slurry for an all-solid-state secondary battery positive electrode prepared in the foregoing was applied onto aluminum foil by a doctor blade method, and was dried over 3 hours by evaporating diisobutyl ketone under reduced pressure at 120° C., to thereby produce an all-solid-state secondary battery positive electrode having formed thereon a positive electrode active material layer having a thickness of 0.1 mm.

<Production of Solid Electrolyte Layer>

The slurry for an all-solid-state secondary battery solid electrolyte prepared in the foregoing was applied onto a release PET film by the doctor blade method, and was dried over 3 hours by evaporating diisobutyl ketone under reduced pressure at 120° C., to thereby produce a solid electrolyte layer having a thickness of 0.1 mm.

<Production of all-Solid-State Secondary Battery Negative Electrode>

The slurry for an all-solid-state secondary battery negative electrode prepared in the foregoing was applied onto stainless-steel foil by the doctor blade method, and was dried over 3 hours by evaporating diisobutylketone under reduced pressure at 120° C., to thereby produce an all-solid-state secondary battery negative electrode having formed thereon a negative electrode active material layer having a thickness of 0.1 mm.

<Peeling Strength Test of all-Solid-State Secondary Battery Positive Electrode>

With regard to the positive electrode active material layer formed on the aluminum foil of the all-solid-state secondary battery positive electrode obtained in the foregoing, a tape having a width of 20 mm was stuck on the positive electrode active material layer, and peeling strength at the time of the peeling thereof under the conditions of a peel angle of 90° and a peel speed of 50 mm/min was measured. Evaluation criteria are as described below. The result is shown in Table 1 below.

(Evaluation Criteria)

AA: The peeling strength is 20 N/m or more.

A: The peeling strength is 10 N/m or more and less than 20 N/m.

B: The peeling strength is 5 N/m or more and less than 10 N/m.

C: The peeling strength is less than 5 N/m.

<Polymer Distribution Coefficient of all-Solid-State Secondary Battery Positive Electrode>

For the positive electrode active material layer formed on the aluminum foil of the all-solid-state secondary battery positive electrode obtained in the foregoing, a polymer distribution coefficient in the thickness direction of the positive electrode active material layer was calculated as described below.

First, the obtained all-solid-state secondary battery positive electrode was divided into two. Then, a fixing stage was produced by bonding 120 mm of a double-sided tape (manufactured by Nichiban Co., Ltd., product number: "NW-25") to a 70 mmx 150 mm aluminum plate prepared in advance, and further bonding a Kapton tape (manufactured by Teraoka Corporation, product number: "650S") onto the double-sided tape so that its pressure-sensitive adhesive surface faced upward. The active material layer side of a test piece obtained by cutting the obtained all-solid-state secondary battery positive electrode into a size of 20 mmx 100 mm was bonded onto the fixing stage, and was pressure-bonded thereonto with a roller. The fixing stage having the test piece fixed thereto was placed on a horizontal surface, and the current collector was peeled from the bonding surface by pulling the test piece upward at a constant speed so as to have an angle of 900 with the fixing stage. After that, the active material layer up to a depth of 1.5 μm from the surface of the active material layer remaining on the current collector side and a depth of 1.5 μm from the surface of the active material remaining on the pressure-sensitive adhesive tape side was scraped off, and was used as a measurement sample A. Meanwhile, the entirety of the active material layer was scraped off of the other divided electrode, and was used as a measurement sample B. Each of the measurement sample A and the measurement sample B was analyzed with a pyrolysis-gas chromatograph including a high-frequency induction heating-type pyrolyzer to calculate the content (mass %) of a polymer component per unit weight of each sample. The resultant values were substituted into the following equation to calculate the polymer distribution coefficient, and evaluation was performed by the following criteria. The result is shown in Table 1 below.

Polymer distribution coefficient=(polymer content of measurement sample *A*: mass %)/(polymer content of measurement sample *B*: mass %)

(Evaluation Criteria)

AA: The polymer distribution coefficient is 0.85 or more and less than 1.0.

A: The polymer distribution coefficient is 0.7 or more and less than 0.85.

B: The polymer distribution coefficient is 0.55 or more and less than 0.7.

C: The polymer distribution coefficient is less than 0.55.

<Flexibility Test of all-Solid-State Secondary Battery Positive Electrode>

The aluminum foil side of a positive electrode test piece was placed along a metal rod having a diameter of 1.0 mm and wound around the metal rod, and whether or not the positive electrode active material layer was cracked and whether or not the wound end part was damaged were evaluated. Evaluation criteria are as described below. The result is shown in Table 1 below. A case in which damage to the positive electrode active material layer is not found indicates that the flexibility of the test piece is high and the process suitability for assembling an all-solid-state secondary battery is satisfactory.

(Evaluation Criteria)

A: There is no crack in the positive electrode active material layer, and there is no damage to the wound end part.

B: There is no crack in the positive electrode active material layer, and there is damage to the wound end part.

C: There is a crack in the positive electrode active material layer.

<Lithium Ion Conductivity Measurement of Solid Electrolyte Layer>

The solid electrolyte layer peeled from the PET film was sandwiched in a cell formed of two flat plates made of stainless steel, measurement was performed using an impedance analyzer, and a lithium ion conductivity was calculated from a Nyquist plot. Evaluation criteria are as described below. The result is shown in Table 1 below. A higher lithium ion conductivity indicates that an all-solid-state secondary battery having more satisfactory battery performance can be obtained.

(Evaluation Criteria)

AA: The lithium ion conductivity is $0.8\times10^{-4}$ S/cm or more and $1.0\times10^{-4}$ S/cm or less.

A: The lithium ion conductivity is $0.5\times10^{-4}$ S/cm or more and less than $0.8\times10^{-4}$ S/cm.

B: The lithium ion conductivity is $0.2\times10^{-4}$ S/cm or more and less than $0.5\times10^{-4}$ S/cm.

C: The lithium ion conductivity is less than $0.2\times10^{-4}$ S/cm.

6.3.4. Production and Evaluation of all-Solid-State Secondary Battery

<Production of all-Solid-State Secondary Battery>

The all-solid-state secondary battery positive electrode produced in the foregoing was cut into a disc shape having a diameter of 13 mm, and the all-solid-state secondary battery negative electrode and the solid electrolyte layer peeled from the PET film were each cut into a disc shape having a diameter of 15 mm. Next, the all-solid-state secondary battery positive electrode was bonded to one surface of the solid electrolyte layer so that the surface of the positive electrode active material layer of the all-solid-state secondary battery positive electrode was brought into contact with the solid electrolyte layer. The all-solid-state secondary battery negative electrode was bonded to the other surface of the solid electrolyte layer so that the surface of the negative electrode active material layer of the all-solid-state secondary battery negative electrode was brought into contact with the solid electrolyte layer, and the resultant was pressurized (600 MPa, 1 minute) while being heated (120° C.) through use of a heat press machine to produce a laminate for an all-solid-state secondary battery having the following laminated structure: aluminum foil/positive electrode active material layer/solid electrolyte layer/negative electrode active material layer/stainless-steel foil. Then, the thus produced laminate for an all-solid-state secondary battery was placed in a 2032-type coin case made of stainless steel having incorporated thereinto a spacer and a washer, and the 2032-type coin case was crimped to produce an all-solid-state secondary battery.

<Cycle Life Characteristic (Capacity Retention Ratio)>

A charge-discharge test was performed using the all-solid-state secondary battery produced in the foregoing under an environment of 30° C. For charge and discharge, measurement was performed at a 0.1 C rate in the potential range of from 4.2 V to 3.0 V. The charge and discharge at the 0.1 C rate were repeated, and a capacity retention ratio after 20 cycles was calculated by the following equation, with the discharge capacity in the 1st cycle being represented by A (mAh/g) and the discharge capacity in the 20th cycle being represented by B (mAh/g). Evaluation criteria are as described below. The results are shown in Table 1 below.

$$\text{Capacity retention ratio (\%) after 20 cycles}=(B/A)\times 100$$

"C" in "C rate" represents a time rate, and is defined as (1/X)C=rated capacity (Ah)/X (h). X represents a period of time for charging or discharging the rated capacity amount of electricity. For example, 0.1 C means that a current value is the rated capacity (Ah)/10 (h).

(Evaluation Criteria)

- AA: The capacity retention ratio is 95% or more and 100% or less.
- A: The capacity retention ratio is 90% or more and less than 95%.
- B: The capacity retention ratio is 85% or more and less than 90%.
- C: The capacity retention ratio is less than 85%.

6.4. Examples 2 to 12 and Comparative Examples 1 to 3

Binder compositions, slurries for all-solid-state secondary batteries, all-solid-state secondary battery positive and negative electrodes and solid electrolyte layers, and all-solid-state secondary batteries were produced and evaluated in the same manner as in Example 1 described above except that the kinds and amounts of the components to be used were set as shown in Tables 1 and 2 below.

6.5. Evaluation Results

In Tables 1 and 2 below, the compositions of the polymers used in Examples 1 to 12 and Comparative Examples 1 to 3, and the respective physical properties and the respective evaluation results are summarized.

TABLE 1

| Example No. | | | Example 1 | Example 2 | Example 3 | Example 4 |
|---|---|---|---|---|---|---|
| Polymer raw material (use amount) | Synthesis Example No. | | Synthesis Example A-1 | Synthesis Example A-2 | Synthesis Example A-3 | Synthesis Example A-4 |
| | Polymerization solvent (Kg) | Hexane | 10.2 | 10.2 | 10.2 | 10.2 |
| | Polymerization initiator (mmol) | n-Butyllithium | 12.5 | 16.5/11.5 | 12.5 | 14.29/22.52 |
| | Vinyl control agent (ml) | Tetrahydrofuran | 9.1 | 6.1 | 9.1 | 6.1 |
| | | Ethylene glycol diethyl ether | 0.8 | 5.5 | 1.8 | 1.2 |
| | | Ethylene glycol dibutyl ether | | | | |
| | Monomer (g) | 1,3-Butadiene | 855/1,045 | 855/1,045 | 814/994 | 720/1,080 |
| | | Styrene | 45/55 | 45/55 | 86/106 | 80/120 |
| | | Divinylbenzene | | | | |
| | Modifier (mmol) | [3-(Diethylamino)propyl]trimethoxysilane | 12.5 | 7.66 | 12.5 | 15.01 |
| | | N,N-Bis(trimethylsily1)aminopropylmethyldiethoxysilane | | | | |
| | | Silicon tetrachloride | | 1.73 | | 1.07 |
| | | Tin tetrachloride | | | | |
| | Reaction terminator (ml) | Methanol | 0.8 | 1.7 | 0.8 | 2.3 |
| | Anti-aging agent (g) | Sumilizer GM | 8 | 8 | 8 | 8 |
| | | Sumilizer TP-D | 4 | 4 | 4 | 4 |
| | | 2,6-Di-tert-butyl-p-cresol | | | | |
| Polymer | Kind | | A-1 | A-2 | A-3 | A-4 |
| | 1,2-Vinyl bond content (mol %) | | 63 | 63 | 52 | 41 |
| | Bound styrene content (%) | | 5 | 5 | 9 | 10 |
| | Weight average molecular weight (Mw) | | 250,000 | 470,000 | 260,000 | 580,000 |
| | α | | 0 | 0 | 0 | 0 |
| | Hydrogenation ratio (%) | | 0 | 0 | 0 | 0 |
| | SP value ($MPa^{1/2}$) | | 16.91 | 16.91 | 17.06 | 17.14 |

TABLE 1-continued

| | | | | | | |
|---|---|---|---|---|---|---|
| Binder composition | Kind of liquid medium (B) | | DIBK | DIBK | Mesitylene | Mesitylene |
| | SP value of liquid medium (B) ($MPa^{1/2}$) | | 16.0 | 16.0 | 18.0 | 18.0 |
| | Absolute value $SP_P$-$SP_S$\| of difference (A-B) between SP values of polymer (A) and liquid medium (B) \|$SP_P$-$SP_S$\| | | 0.91 | 0.91 | 0.94 | 0.86 |
| | Additionally added anti-aging agent (loading amount, ppm) | Sumilizer GM | 500 | 500 | 500 | 500 |
| | Total solid content (%) | | 10.1 | 10.2 | 10.2 | 10.2 |
| Slurry characteristics | Dispersion stability of slurry | | A | A | A | AA |
| Electrode characteristics | Peeling strength test | | A | AA | A | AA |
| | Polymer distribution coefficient | | A | A | A | AA |
| | Flexibility test | | A | A | A | AA |
| Electrical storage device characteristics | Lithium ion conductivity | | A | A | A | AA |
| | Cycle life characteristic (capacity retention ratio) | | A | A | A | AA |

| | Example No. | | Example 5 | Example 6 | Example 7 | Example 8 |
|---|---|---|---|---|---|---|
| Polymer raw material (use amount) | Synthesis Example No. | | Synthesis Example A-5 | Synthesis Example A-6 | Synthesis Example A-7 | Synthesis Example A-8 |
| | Polymerization solvent (Kg) | Hexane | 10.2 | 10.2 | 15.3 | 10.2 |
| | Polymerization initiator (mmol) | n-Butyllithium | 12.5 | 7.8 | 19.13/27.98 | 13.6 |
| | Vinyl control agent (ml) | Tetrahydrofuran | 8.3 | 6.1 | 10.3 | 6.9 |
| | | Ethylene glycol diethyl ether | | 0.4 | 1.8 | 3.4 |
| | | Ethylene glycol dibutyl ether | 1.5 | | | |
| | Monomer (g) | 1,3-Butadiene | 900/900 | 520/780 | 906/1,044 | 650/850 |
| | | Styrene | 100/100 | | 796/254 | 350/150 |
| | | Divinylbenzene | | | | |
| | Modifier (mmol) | [3-(Diethylamino)propyl]trimethoxysilane | 12.5 | 7.8 | 18.65 | 13.6 |
| | | N,N-Bis(trimethylsily1)aminopropylmethyldiethoxysilane | | | | |
| | | Silicon tetrachloride | | | 1.67 | |
| | | Tin tetrachloride | | | | |
| | Reaction terminator (ml) | Methanol | 0.8 | 0.5 | 2.9 | 0.8 |
| | Anti-aging agent (g) | Sumilizer GM | 8 | 5.2 | 12 | 8 |
| | | Sumilizer TP-D | 4 | 2.6 | 6 | 4 |
| | | 2,6-Di-tert-butyl-p-cresol | | | | |
| Polymer | Kind | | A-5 | A-6 | A-7 | A-8 |
| | 1,2-Vinyl bond content (mol %) | | 40 | 28 | 35 | 60 |
| | Bound styrene content (%) | | 10 | 0 | 35 | 25 |
| | Weight average molecular weight (Mw) | | 250,000 | 270,000 | 460,000 | 230,000 |
| | α | | 0 | 0 | 0 | 0 |
| | Hydrogenation ratio (%) | | 0 | 0 | 0 | 0 |
| | SP value ($MPa^{1/2}$) | | 17.14 | 17.01 | 17.7 | 17.37 |
| Binder composition | Kind of liquid medium (B) | | Mesitylene | Mesitylene | Mesitylene | Mesitylene |
| | SP value of liquid medium (B) ($MPa^{1/2}$) | | 18.0 | 18.0 | 18.0 | 18.0 |
| | Absolute value $SP_P$-$SP_S$\| of difference (A-B) between SP values of polymer (A) and liquid medium (B) \|$SP_P$-$SP_S$\| | | 0.86 | 0.99 | 0.3 | 0.63 |
| | Additionally added anti-aging agent (loading amount, ppm) | Sumilizer GM | 500 | 500 | 500 | 500 |
| | Total solid content (%) | | 10.1 | 10.2 | 10.1 | 10.2 |
| Slurry characteristics | Dispersion stability of slurry | | AA | A | A | A |
| Electrode characteristics | Peeling strength test | | AA | A | A | A |
| | Polymer distribution coefficient | | AA | A | AA | A |
| | Flexibility test | | AA | AA | A | A |
| Electrical storage device characteristics | Lithium ion conductivity | | AA | AA | A | A |
| | Cycle life characteristic (capacity retention ratio) | | AA | A | A | A |

TABLE 2

| | Example No. | | Example 9 | Example 10 | Example 11 | Example 12 |
|---|---|---|---|---|---|---|
| Polymer raw material (use amount) | Synthesis Example No. | | Synthesis Example A-9 | Synthesis Example A-10 | Synthesis Example A-11 | Synthesis Example A-12 |
| | Polymerization solvent (Kg) | Hexane | | | | |
| | | Cyclohexane | 25 | 25 | 25.9 | 25.9 |
| | Polymerization initiator (mmol) | n-Butyllithium | 51.5 | 51.5 | 39 | 39 |
| | Vinyl control agent (ml) | Tetrahydrofuran | 562 | 562 | 75 | 29 |
| | | Ethylene glycol diethyl ether | | | | |
| | | Ethylene glycol dibutyl ether | | | | |
| | Monomer (g) | 1,3-Butadiene | 3,900/100 | 3,900/100 | 3.264/111 | 2,361/111 |
| | | Styrene | 1,000 | 1,000 | 370 | 1,273 |
| | | Divinylbenzene | 0.55 | | | |
| | Modifier (mmol) | [3-(Diethylamino)propyl]trimethoxysilane | | | 28 | 28 |
| | | N,N-Bis(trimethylsilyl)aminopropylmethyldiethoxysilane | 43.8 | | | |
| | | Silicon tetrachloride | | | 2 | 2 |
| | | Tin tetrachloride | 2.1 | 10 | | |
| | Reaction terminator (ml) | Methanol | | | | |
| | Anti-aging agent (g) | Sumilizer GM | | | | |
| | | Sumilizer TP-D | | | | |
| | | 2,6-Di-tert-butyl-p-cresol | 15 | 15 | 12 | 12 |
| Polymer | Kind | | A-9 | A-10 | A-11 | A-12 |
| | 1,2-Vinyl bond content (mol %) | | 55 | 55 | 35 | 27 |
| | Bound styrene content (%) | | 20 | 20 | 10 | 34 |
| | Weight average molecular weight (Mw) | | 310,000 | 650,000 | 340.000 | 370,000 |
| | α | | 0 | 0 | 0.4 | 0.6 |
| | Hydrogenation ratio (%) | | 0 | 0 | 40 | 60 |
| | SP value ($MPa^{1/2}$) | | 17.27 | 17.27 | 16.83 | 17.24 |
| Binder composition | Kind of liquid medium (B) | | Mesitylene | Mesitylene | DIBK | Mesitylene |
| | SP value of liquid medium (B) ($MPa^{1/2}$) | | 18.0 | 18.0 | 16.0 | 18.0 |
| | Absolute value $\lvert SP_P-SP_S \rvert$ of difference (A-B) between SP values of polymer (A) and liquid medium (B) $\lvert SP_P-SP_S \rvert$ | | 0.73 | 0.73 | 0.83 | 0.76 |
| | Additionally added anti-aging agent (loading amount, ppm) | Sumilizer GM | 500 | 500 | 500 | 500 |
| | Total solid content (%) | | 10.1 | 10.2 | 10.1 | 10.1 |
| Slurry characteristics | Dispersion stability of slurry | | A | A | AA | A |
| Electrode characteristics | Peeling strength test | | AA | AA | A | A |
| | Polymer distribution coefficient | | AA | AA | AA | AA |
| | Flexibility test | | A | A | B | B |
| Electrical storage device characteristics | Lithium ion conductivity | | A | A | A | A |
| | Cycle life characteristic (capacity retention ratio) | | A | A | A | A |

| | Example No. | | Comparative Example 1 | Comparative Example 2 | Comparative Example 3 |
|---|---|---|---|---|---|
| Polymer raw material (use amount) | Synthesis Example No. | | Synthesis Example A-13 | Synthesis Example A-14 | Synthesis Example A-15 |
| | Polymerization solvent (Kg) | Hexane | 10.2 | 10.2 | |
| | | Cyclohexane | | | 25.9 |
| | Polymerization initiator (mmol) | n-Butyllithium | 10.5 | 14.29/22.52 | 39 |
| | Vinyl control agent (ml) | Tetrahydrofuran | 6.1 | 6.1 | 75 |
| | | Ethylene glycol diethyl ether | 9.7 | 1 | |
| | | Ethylene glycol dibutyl ether | | | |
| | Monomer (g) | 1,3-Butadiene | 706/1,058 | 450/710 | 3,264/111 |
| | | Styrene | 6/30 | 350/490 | 370 |
| | | Divinylbenzene | | | |
| | Modifier (mmol) | [3-(Diethylamino)propyl]trimethoxysilane | 10.5 | 15.01 | 28 |
| | | N,N-Bis(trimethylsilyl)aminopropylmethyldiethoxysilane | | | |
| | | Silicon tetrachloride | | 1.07 | 2 |
| | | Tin tetrachloride | | | |
| | Reaction terminator (ml) | Methanol | 0.8 | 2.3 | |
| | Anti-aging agent (g) | Sumilizer GM | 8 | 8 | |
| | | Sumilizer TP-D | 4 | 4 | |
| | | 2,6-Di-tert-butyl-p-cresol | | | 12 |
| Polymer | Kind | | A-13 | A-14 | A-15 |
| | 1,2-Vinyl bond content (mol %) | | 76 | 38 | 35 |
| | Bound styrene content (%) | | 2 | 42 | 10 |
| | Weight average molecular weight (Mw) | | 260,000 | 550,000 | 340,000 |
| | α | | 0 | 0 | 0.88 |

TABLE 2-continued

| | | | | |
|---|---|---|---|---|
| | Hydrogenation ratio (%) | 0 | 0 | 88 |
| | SP value ($MPa^{1/2}$) | 16.75 | 17.84 | 16.42 |
| Binder composition | Kind of liquid medium (B) | Anisole | DIBK | DIBK |
| | SP value of liquid medium (B) ($MPa^{1/2}$) | 19.5 | 16.0 | 16.0 |
| | Absolute value $\|SP_P\text{-}SP_S\|$ of difference (A-B) between SP values of polymer (A) and liquid medium (B) $\|SP_P\text{-}SP_S\|$ | 2.75 | 1.84 | 0.42 |
| | Additionally added anti-aging agent (loading amount, ppm) Sumilizer GM | 500 | 500 | 500 |
| | Total solid content (%) | 10.2 | 10.2 | 10.1 |
| Slurry characteristics | Dispersion stability of slurry | C | C | A |
| Electrode characteristics | Peeling strength test | B | B | C |
| | Polymer distribution coefficient | C | C | B |
| | Flexibility test | B | B | C |
| Electrical storage device characteristics | Lithium ion conductivity | B | C | C |
| | Cycle life characteristic (capacity retention ratio) | C | C | C |

The abbreviations or the product names in Tables 1 and 2 above represent the following compounds, respectively.

<Anti-Aging Agent>

Sumilizer GM: manufactured by Sumitomo Chemical Co., Ltd., 2-tert-butyl-6-(3-tert-butyl-2-hydroxy-5-methylbenzyl)-4-methylphenyl acrylate Sumilizer TP-D: manufactured by Sumitomo Chemical Co., Ltd., pentaerythritol tetra(3-dodecylthiopropionate)

<Liquid Medium (B)>

DIBK: diisobutyl ketone

It was recognized from the results of Tables 1 and 2 that, when the binders of Examples 1 to 12 and the binder compositions containing the binders were used, all-solid-state secondary batteries excellent in lithium ion conductivity and capable of achieving a satisfactory cycle life characteristic even under a high voltage were able to be produced.

In addition, in each of Examples 1 to 12, a slurry obtained by incorporating an active material and a solid electrolyte into the binder composition for an all-solid-state secondary battery according to the present invention is used as each of the slurries for all-solid-state secondary batteries. It was recognized that the slurry had satisfactory dispersion stability as compared to the cases of Comparative Examples 1 to 3. In addition, it was recognized that, in the active material layer formed from the slurry, sufficient binding properties were obtained for the polymer between both the active material and the solid electrolyte with no occurrence of, for example, detachment of the active material and the solid electrolyte, or cracks due to the active material layer itself becoming brittle at the time of the measurement of the peeling strength. Further, it was also recognized that the active material layer also had satisfactory flexibility. A presumed reason for this is that the conjugated diene-based polymer (A) contained in each of the binder compositions of Examples 1 to 12 shown in Tables 1 and 2 above had an SP value in the range of from 16.8 $MPa^{1/2}$ to 17.8 $MPa^{1/2}$ with the absolute value of the difference in SP value with the liquid medium (B) being 1.5 $MPa^{1/2}$ or less, and hence a high binding force was able to be maintained, with the result that the solid electrolyte thus formed obtained sufficient adhesiveness to the active material layer.

The present invention is not limited to the embodiments described above, and various modifications may be made thereto. The present invention encompasses substantially the same configurations as the configurations described in the embodiments (e.g., configurations having the same functions, methods, and results, or configurations having the same objects and effects). The present invention also encompasses configurations obtained by replacing non-essential parts of the configurations described in the embodiments with other configurations. The present invention also encompasses configurations exhibiting the same actions and effects or configurations capable of achieving the same objects as those of the configurations described in the embodiments. The present invention also encompasses configurations obtained by adding known technologies to the configurations described in the embodiments.

The invention claimed is:

1. A binder, comprising:

a conjugated diene-based polymer (A) having a bound styrene content in a range of from 5 to 40%, wherein the conjugated diene-based polymer (A) has a conjugated diene unit based on a conjugated diene compound, wherein the conjugated diene-based polymer (A) has a solubility parameter (SP value) of 16.80 $MPa^{1/2}$ or more and 17.80 $MPa^{1/2}$ or less, wherein the conjugated diene-based polymer (A) has a value a calculated by equation (1), of less than 0.7:

$$\alpha=(p+(0.5\times r))/(p+q+(0.5\times r)+s) \quad (i),$$

wherein p is a constituent molar ratio of a structural unit of formula (1):

(1)

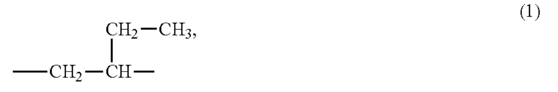

q is a constituent molar ratio of a structural unit of formula (2):

(2)

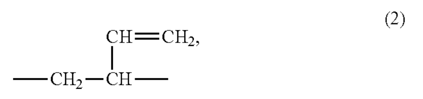

r is a constituent molar ratio of a structural unit of formula (3):

(3)

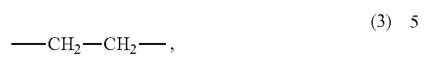

and s is a constituent molar ratio of a structural unit of formula (4):

(4)

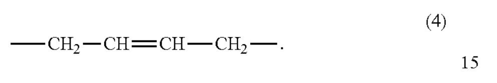

2. The binder of claim 1, wherein the value α of the conjugated diene-based polymer (A) is less than 0.6.

3. The binder of claim 1, wherein the conjugated diene-based polymer (A) further comprises an aromatic vinyl unit based on an aromatic vinyl compound.

4. The binder of claim 1, wherein the bound styrene content of the conjugated diene-based polymer (A) is in a range of from 8 to 30%.

5. The binder of claim 1, wherein the conjugated diene-based polymer (A) has a further comprises a unit based on a modifier comprising a nitrogen atom, an oxygen atom, a silicon atom, a germanium atom, and/or a tin atom.

6. A binder composition, comprising:

the binder of claim 1; and a liquid medium (B), wherein an absolute value $|SP_{diff}=|SP_P-SP_S|$ of a difference between the solubility parameter $SP_P$ of the conjugated diene-based polymer (A) and a solubility parameter $SP_S$ of the liquid medium (B) is 1.5 or less.

7. The binder composition of claim 6, wherein the liquid medium (B) comprises an aliphatic hydrocarbon, an alicyclic hydrocarbon, an aromatic hydrocarbon, ketone, ester, and/or ether.

8. The binder composition of claim 6, wherein the conjugated diene-based polymer (A) is dissolved in the liquid medium (B).

9. A slurry, comprising:

the binder composition of claim 6; and a solid electrolyte.

10. The slurry of claim 9, wherein the slurry comprises, as the solid electrolyte, a sulfide-based solid electrolyte.

11. An all-solid-state secondary battery, comprising:

a positive electrode active material layer;

a solid electrolyte layer; and a negative electrode active material layer, wherein the positive electrode active material layer, the solid electrolyte layer, and/or the negative electrode active material layer is a layer formed by applying and drying the slurry of claim 9.

12. A solid electrolyte sheet, comprising:

a substrate; and a layer formed on the substrate by applying and drying the slurry of claim 9.

13. An all-solid-state secondary battery, comprising:

a positive electrode active material layer;

a solid electrolyte layer; and a negative electrode active material layer, wherein the positive electrode active material layer, the solid electrolyte layer, and/or the negative electrode active material layer is a layer formed of the solid electrolyte sheet of claim 12.

14. A method of producing a solid electrolyte sheet, the method comprising:

applying the slurry of claim 9 onto a substrate; and drying the slurry.

15. A method of producing an all-solid-state secondary battery, comprising:

producing a solid electrolyte sheet via the method of claim 14; and applying the solid electrolyte sheet as a positive electrode active material layer, a solid electrolyte layer, and/or a negative electrode active material layer for the all-solid-state secondary battery.

16. The slurry to claim 9, wherein the slurry comprises, as the solid electrolyte, an oxide-based solid electrolyte.

17. The binder of claim 6, wherein the conjugated diene-based polymer (A) in the binder further comprises an aromatic vinyl unit based on an aromatic vinyl compound.

18. The binder of claim 6, wherein the bound styrene content of the conjugated diene-based polymer (A) in the binder is in a range of from 8 to 30%.

19. The binder of claim 6, wherein the conjugated diene-based polymer (A) in the binder further comprises a unit based on a modifier comprising a nitrogen atom, an oxygen atom, a silicon atom, a germanium atom, and/or a tin atom.

20. The binder of claim 1, wherein a 1,2-vinyl bond content of the conjugated diene-based polymer (A) in the structural unit derived from butadiene is in a range of from 5 to 70 mass %.

* * * * *